United States Patent
Louizos et al.

(10) Patent No.: US 12,271,796 B2
(45) Date of Patent: Apr. 8, 2025

(54) MACHINE LEARNING SYSTEM TO GENERATE OUTPUT USING FIRST AND SECOND LATENT SPACES

(71) Applicant: Robert Bosch GmbH, Stuttgart (DE)

(72) Inventors: Christos Louizos, Utrecht (NL); Welling Max, Bussum (NL); Xiahan Shi, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 885 days.

(21) Appl. No.: 16/893,083

(22) Filed: Jun. 4, 2020

(65) Prior Publication Data

US 2020/0394506 A1    Dec. 17, 2020

(30) Foreign Application Priority Data

Jun. 14, 2019  (EP) .................................. 19180246

(51) Int. Cl.
| | |
|---|---|
| G06F 9/54 | (2006.01) |
| G06F 18/214 | (2023.01) |
| G06N 3/063 | (2023.01) |
| G06N 3/08 | (2023.01) |
| G06N 20/10 | (2019.01) |

(52) U.S. Cl.
CPC ............ *G06N 20/10* (2019.01); *G06F 9/545* (2013.01); *G06F 18/214* (2023.01); *G06N 3/063* (2013.01); *G06N 3/08* (2013.01)

(58) Field of Classification Search
CPC .......... G06N 20/10; G06N 3/063; G06N 3/08; G06N 3/045; G06N 3/047; G06N 5/01; G06N 7/01; G06N 3/084; G06F 9/545; G06F 18/214; G06F 18/24; G06F 18/29; G05B 13/042; G06V 20/00; G06V 20/582; G06V 20/584; G06V 20/56
See application file for complete search history.

(56) References Cited

U.S. PATENT DOCUMENTS

| | | | |
|---|---|---|---|
| 11,010,421 B2 | 5/2021 | Yada et al. | |
| 2019/0034798 A1 | 1/2019 | Yu et al. | |

FOREIGN PATENT DOCUMENTS

| | | | |
|---|---|---|---|
| CN | 107679859 A | 2/2018 | |
| CN | 108459784 A | 8/2018 | |
| CN | 109804362 A | 5/2019 | |
| WO | 2018161217 A1 | 9/2018 | |
| WO | WO-2019155065 A1 * | 8/2019 | ............. A63F 13/67 |

OTHER PUBLICATIONS

Unlusoy ME304 Control Systems Ch1_Introduction, Middle East Technical University, 2017 (Year: 2017).*

(Continued)

*Primary Examiner* — Aniss Chad
*Assistant Examiner* — Shien Ming Chou
(74) *Attorney, Agent, or Firm* — NORTON ROSE FULBRIGHT US LLP; Gerard A. Messina

(57) ABSTRACT

A machine learning system configured to map an input data instance to an output according to a system mapping. The system mapping may be composed from multiple functions. A latent input vector may be determined in a second latent space for the input data instance, from latent reference vectors related to a number of reference data instances identified as parents.

17 Claims, 10 Drawing Sheets

(56) References Cited

OTHER PUBLICATIONS

Bartunov, Fast Adaptation in Generative Models with Generative Matching Networks, ICLR 2017 (Year: 2017).*
Garnelo, Conditional Neural Processes, International Conference on Machine Learning, 2018 (Year: 2018).*
Sohn, Learning structured output representation using deep conditional generative models, NIPS'15: Proceedings of the 28th International Conference on Neural Information Processing Systems—vol. 2, Dec. 2015 pp. 3483-3491 (Year: 2015).*
Vinyal, Matching Networks for One Shot Learning, arXiv, 2017 (Year: 2017).*
Jiang, Huajie, et al., "Learning Class Prototypes via Structure Alignment for Zero-Shot Recognition," International Conference on Financial Cryptography and Data Security, Springer, Berlin, Heidelberg, 2018, pp. 121-138. XP047488371.
Liu, Kun, et al., "Generalized Zero-Shot Learning for Action Recognition With Web-Scale Video Data," Computer Vision and Pattern Recognition, Cornell University, 2017, pp. 1-19. XP080830311.
Mensink, Thomas, et al., "Zero-Shot Learning for Computer Vision," University of Amsterdam, 2017, pp. 1-63. XP055647614.
Cetin, Samet, "Zero-Shot Learning," 2018, pp. 1-14. XP055647612.

* cited by examiner

MACHINE LEARNING SYSTEM TO GENERATE OUTPUT USING FIRST AND SECOND LATENT SPACES

CROSS REFERENCE

The present application claims the benefit under 35 U.S.C. § 119 of European Patent Application No. EP 19180246.1 filed on Jun. 14, 2019, which is expressly incorporated herein by reference in its entirety.

FIELD

The present invention relates to a machine learning system, an autonomous device controller, a machine learning method and a computer readable medium.

BACKGROUND INFORMATION

Neural networks are a prevalent paradigm for approximating functions of almost any kind. Their highly flexible parametric form coupled with large amounts of data allows for accurate modelling of the underlying task, a fact that usually leads to state of the art prediction performance. While predictive performance is definitely an important aspect, in a lot of safety critical applications, such as self-driving cars, one also desires accurate uncertainty estimates about the predictions.

Bayesian neural networks have been an attempt at imbuing neural networks with the ability to model uncertainty; they posit a prior distribution over the weights of the network and through inference, they can represent their uncertainty in the posterior distribution. Nevertheless, for such complex models, the choice of the prior is quite difficult since understanding the interactions of the parameters with the data is a non-trivial task. As a result, priors are usually employed for computational convenience and tractability. Furthermore, inference over the weights of a neural network can be a daunting task due to the high dimensionality and posterior complexity.

An alternative way that can "bypass" the aforementioned issues is that of adopting a stochastic process. They posit distributions over functions, e.g., neural networks, directly, without the necessity of adopting prior distributions over global parameters, such as the neural network weights. Gaussian processes (GPs) are an example of a stochastic process. Unfortunately, Gaussian processes have two limitations. For example, the underlying model is not very flexible for high dimensional problems and training and inference is quite costly since it scales cubically with the size of the dataset.

SUMMARY

To address these and other issues, a machine learning system is provided in accordance with the present invention. The machine learning system is configured to map an input data instance to an output according to a system mapping.

In an example embodiment of the present invention, the output is derived from a second latent input vector in a second latent space by applying a third function to the second latent input vector. The second latent input vector may be determined for an input data instance from second latent reference vectors obtained for a number of reference data instances identified as parents of the input data instance. Identifying parent reference data instances may be based upon a similarity between a first latent input vector obtained for the input data instance and first latent reference vectors obtained for a set of reference data instances.

Interestingly, the output is derived from a second latent vector in a second latent space. The input instance is not directly mapped to second latent vector; instead, it is constructed from reference instances, which are related to it. The relation may be determined using a first latent space. This indirect procedure has the advantage that the system is forced to learn the structure of the input distribution well.

Preferably, the various mappings are stochastic rather than deterministic. If needed a mapping may be repeated and averaged to improve accuracy. Various machine learning functions may be applied for the first, second and third functions. However, neural networks have proven to work particularly well.

The machine learning system can be used for the control of physical system. For example, the input data instance and the reference data instances may comprise sensor data, in particular, an image. The output may comprises an output label; for example, the system mapping may be a classification task. Other applications are possible. For example, the system may be trained to predict variables that are hard to measure directly, e.g., the output may comprise a physical quantity of a physical system, such as temperature, pressure and the like.

In an example embodiment of the present invention, the second latent input vector (z) determined for a reference data instance further depends on a corresponding reference label. For example, the function to map from a reference point x, and reference label y to a second latent vector z may be referred to as a function D. For example, one may use $D(x, y)=B(x)+B'(y)$, wherein B' is a function from a reference label to Z. Alternatively, one may model and train $D(x, y)$ in addition or instead to $B(x)$. For example, the second function may be configured to take as input a reference data instance and a corresponding reference label to produce a second latent reference vector. This example embodiment takes advantage of the fact that two latent spaces may be used. In an example embodiment, direct mappings into the second latent space are not used for unseen input data instances, their predictive value may be improved by directly including information about the corresponding labels in the second function. In an example embodiment of the present invention, direct mappings into the second latent space are used for unseen input data instances, modelling consistency is improved by re-using the same second function for reference points as well as for training and unseen points. For example, the latter may be done by introducing a new mapping B' as above.

In an example embodiment, the third function may be configured to take as input the second latent input vector and the first latent input vector to produce the output. Including the first latent input vector increases the exploratory power of the system.

The relationships between training points and reference points, and/or among the reference points may be implemented as learning a graph of dependencies on top of latent representations of the points in the given dataset. In doing so, they define a Bayesian model without explicitly positing a prior distribution over latent global parameters; they instead adopt priors over the relational structure of the given dataset, a task that is much simpler. The models are scalable to large datasets.

The machine learning system may be used in an autonomous device controller. For example, the machine learning system may be used to classify objects in the vicinity of the autonomous device.

For example, the controller may use the neural network to classify objects in the sensor data, and to generate a control signal for controlling the autonomous device using the classification. The controller may be a part of the autonomous device. The autonomous device may include sensors configured to generate sensor data, which may be used for the input of the neural network.

A machine learning system is an electronic system. The system may be comprised in another physical device, e.g., a technical system, for controlling the physical device, e.g., its movement.

An aspect of the present invention is a machine learning method.

An example embodiment of the methods according to the present invention may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product may include non-transitory program code stored on a computer readable medium for performing an embodiment of the method when the program product is executed on a computer.

In an example embodiment, the computer program includes computer program code adapted to perform all or part of the steps of an embodiment of the method when the computer program is run on a computer. Preferably, the computer program may be embodied on a computer readable medium.

Another aspect of the present invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the present invention are described, by way of example, with reference to the figures. Elements in the figures are illustrated for simplicity and clarity and have not necessarily been drawn to scale. In the figures, elements, which correspond to elements already described, may have the same reference numerals.

DETAILED DESCRIPTION OF EXAMPLE EMBODIMENTS

Figure 1:
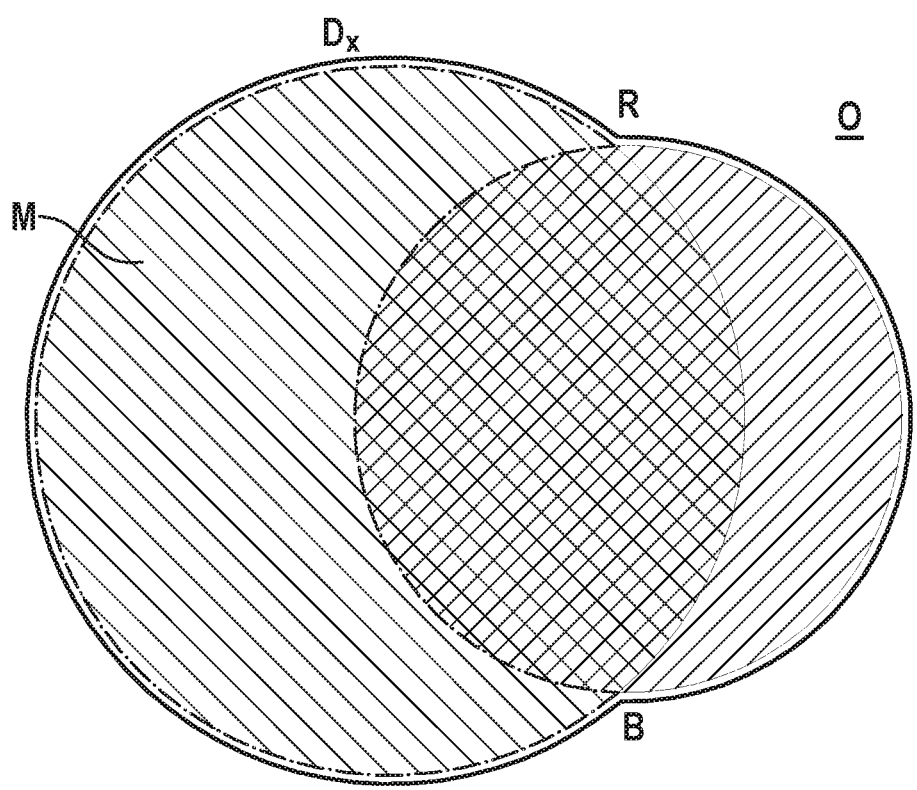
FIG. 1 schematically shows an example of a Venn diagram of sets related to an example embodiment of the present invention.

While the present invention is susceptible of embodiments in many different forms, there are shown in the figures and will herein be described in detail one or more specific embodiments, with the understanding that the present disclosure is to be considered as exemplary of the principles of the presently disclosed subject matter and not intended to limit the present invention to the specific embodiments shown and described.

In the following, for the sake of understanding, elements of embodiments are described in operation. However, it will be apparent that the respective elements are arranged to perform the functions being described as performed by them.

Further, the present invention is not limited to the embodiments, and the present invention lies in each and every novel feature or combination of features described herein.

Prediction tasks show up frequently in computer vision. For example, autonomous device control, e.g., for autonomous cars, depends on decision-making based on reliable classification. One of the problems with predictions made by machine learning systems is that there is often little distinction between predictions for cases in which the system is well-trained and predictions for cases in which the system is not well-trained. For example, consider a neural network trained to classify road signs. If the network is presented with a new, not previously seen road sign, then the neural network will likely make a confident and probably correct classification. However, if the neural network is presented with an image outside the distribution of images used for training, e.g., an image of a cat, then a conventional neural network is prone to still confidently predict a road sign for the image. This is undesirable behavior, there is therefore a need for machine learning systems, which fail gracefully when presented with such an image (referred to as an o.o.d. image for 'outside of distribution'). For example, in an embodiment, the prediction may fall back to some default or close thereto for points outside the data distribution.

Other advantages include the possibility to provide prior knowledge to the model, e.g., to specify an inductive bias. For example, nearby instances may be considered more likely to be parents for a given instance. This is much more intuitive than specifying a prior distribution over global latent variables. The encoding of nearby may depend on the particular type of input data. For example, for images a distance measure, e.g., an L2 measure may be used. If the input data comprises other data then suitable, other distance measure may be included. For example, in an embodiment the input data comprises sensor data of multiple sensors. For temperature, a temperature difference may be used; for pressure, a pressure difference, etc. However, temperature and pressure data may be appropriately scaled to take into account the different scales in which they occur in the modelled system. Multiple distance measures may be combined into a single distance, e.g., by a sum of squares, possibly weighted.

Figure 5:
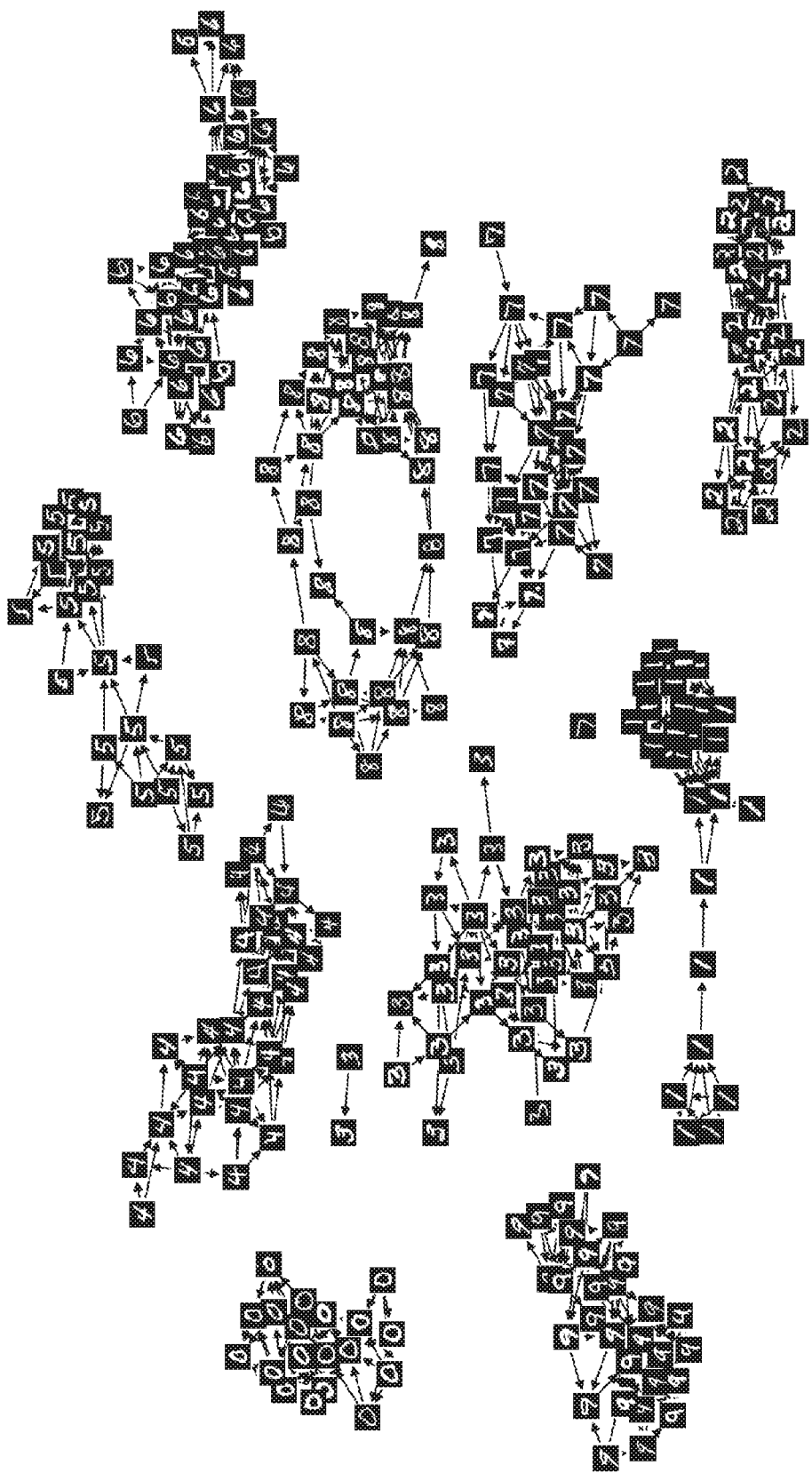
FIG. 5 schematically shows an example of a graph related to an embodiment of the present invention.

A further advantage is that the model is forced to learn the dependency structure between data instances. Furthermore, such dependencies can be visualized. Such visualizations allow debugging of the model. Optionally, an embodiment can compute and visualize these dependencies. If the clustering shown in the so-called G graph (an example of which is shown in FIG. 5) or A graph (these graphs are further explained below) does not conform with reality then the modeler can use this information to further control the machine learning system, e.g., by increasing or decreasing the number of reference points, or by changing the prior knowledge. A further advantage is that in an embodiment, a proper Bayesian model may be obtained, e.g., which is exchangeable and consistent under marginalization. This allows probabilistic modeling and inferring of latent information without having to specify a prior distribution over global latent variables.

A new machine learning system is provided which may be used to train and/or apply machine learnable functions. In an embodiment two different latent spaces are used, e.g., multi-dimensional vector spaces. Elements in these spaces are referred to as first latent vectors and second latent vectors respectively. A vector may also be referred to as a point in the vector space. The output, e.g., the prediction or classification, is made based upon a second latent vector. A special set of reference data instances, which may be drawn from the same distribution as the input data instances is mapped into the second latent space, these are second latent reference vectors.

For training instances different from the reference instances or for unseen input data instances, an indirect approach is used. Both training data instances and reference instances are mapped to the first latent space. Thus, a reference data instance correspond to a vector in the first latent space, e.g., through a first function, and to a vector in the second latent space, e.g., through a second function.

In the first latent space, reference points are selected which are related to a training input instance, e.g., which are similar. A point in the second latent space is then derived from the corresponding point in the second latent space, e.g., they are averaged, possibly in a weighted average. Finally, the output is computed from the determined point in the second latent space. Thus, the system computes the output indirectly from the input, by selecting related so-called parents. This forces the system to develop a better understanding of the structure of the input distribution. This contributes to a better understanding of the input distribution, and to a better ability to recognize that an unseen input is poorly reflected in the input data.

It is noted that one or more or all of the mappings may be stochastic. Rather than deterministically determining an output, a probability distribution is determined, from which the mapping result is then sampled. For example, this may be done for any of the mapping from input instances to the first latent space, for reference instance to the second latent space, to determine parents, and for the mapping from the second latent space to the output.

FIG. 1 schematically shows an example of a Venn diagram of sets related to an embodiment of the present invention.

Shown in FIG. 1 are training inputs $\mathcal{D}_x$. For supervised or partially supervised learning, all or part of the training inputs may be accompanied by a prediction target. For simplicity, we will refer to a prediction target as a label. The prediction target could also be to predict a variable, e.g., a temperature of a system, or to predict multiple labels, e.g., to classify the input, etc. Training input may also be unsupervised, for example, in an embodiment the machine learning system may be trained as an autoencoder, e.g., to compress the input or to serve as an input for a further learning system. For simplicity, it will be assumed that the training inputs are provided with a label, but this is not necessary.

Also shown in FIG. 1 is a reference set R. The reference set R may be taken from the same distribution as the training inputs. Also the reference set R may be associated, in whole or in part, with a prediction target. We will refer to M as the training points not in R, and B, as the union of the training points and R. The white background corresponds to O, the complement of R.

Figure 3A:
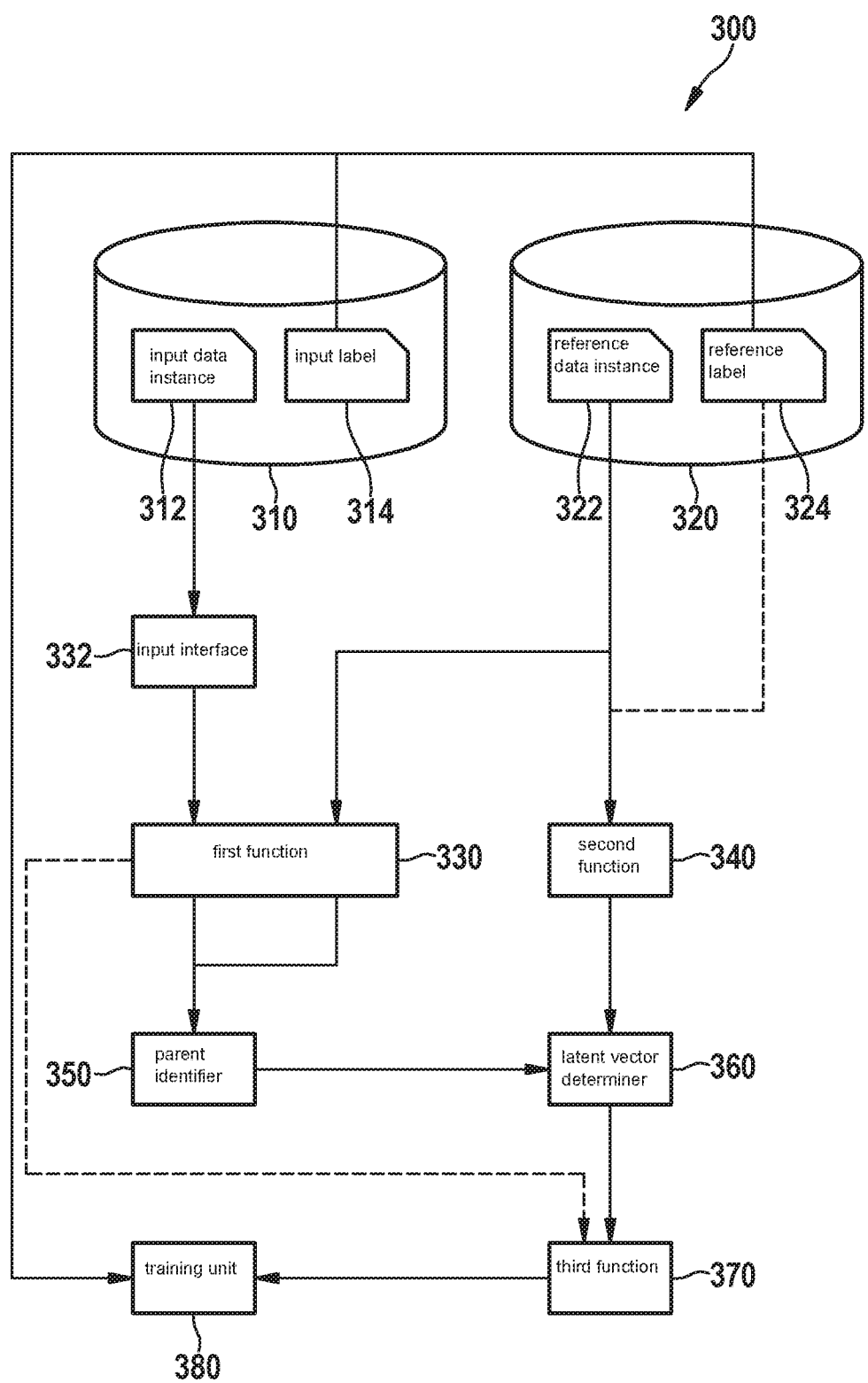
FIG. 3a schematically shows an example embodiment of a machine learning system configured for training a machine learnable function according to the present invention.
Figure 4:
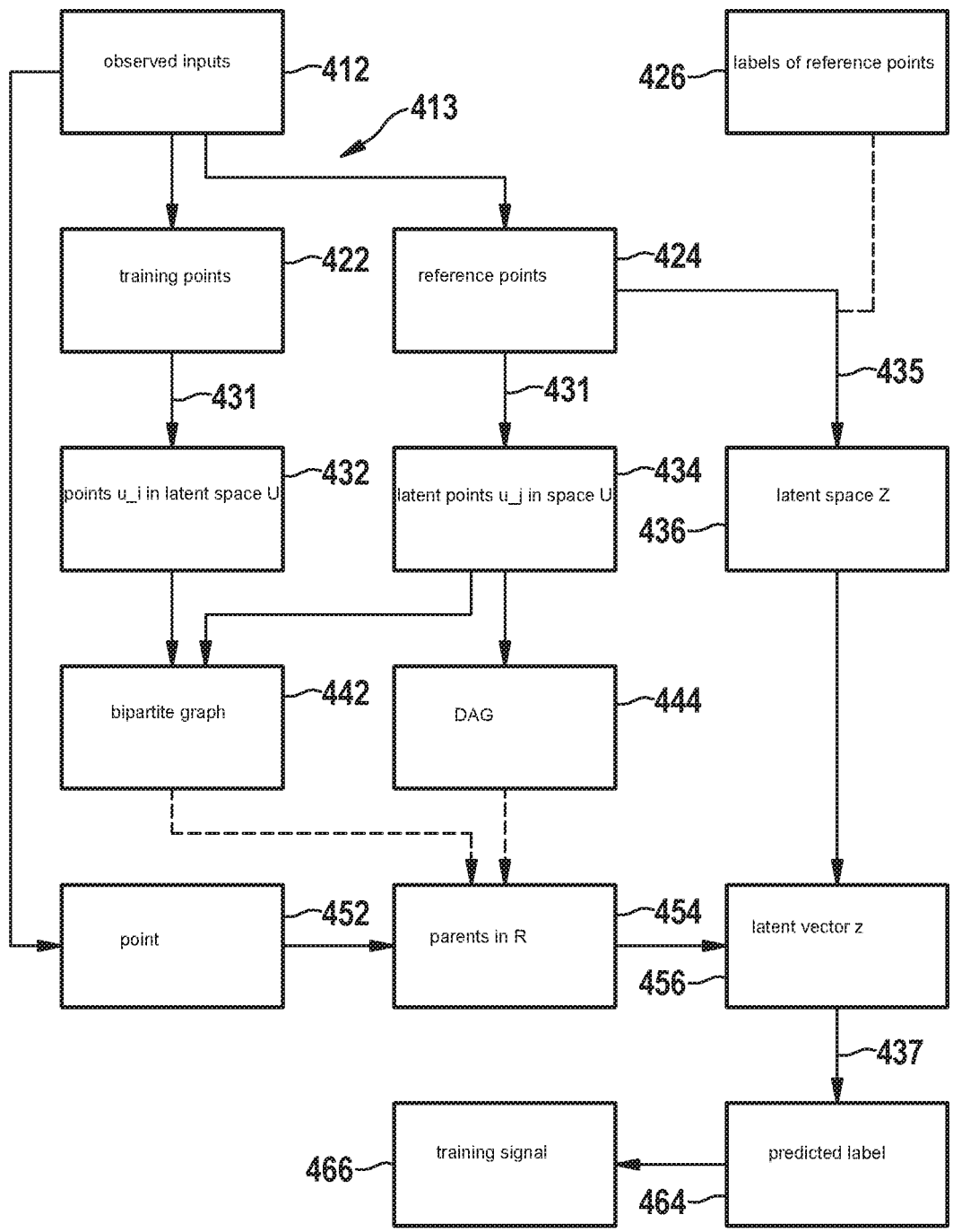
FIG. 4 schematically shows an example of various data in an example embodiment of a machine learning system and/or method according to the present invention.

FIG. 3a schematically shows an example of an embodiment of a machine learning system 300 configured for training a machine learnable function. FIG. 4 schematically shows an example of various data in an embodiment of a machine learning system and/or method. For example, machine learning system 300 may be configured for the embodiment illustrated with FIG. 4.

FIG. 4 shows one exemplifying embodiment, with the understanding that many variations are possible, e.g., as set out herein. The task performed by an embodiment according to FIG. 4 is to train the system for classifying an input. However, the embodiment may be adapted to unsupervised learning. For example, for unsupervised learning a loss function may be determined from another source, e.g., by training the system as an auto-encoder, or in a GAN framework, etc. It is noted that a subset of FIG. 4 may be used to apply the system to an unseen input.

Shown in FIG. 4 at 412 are observed inputs: $\mathcal{D}_x = \{x_1, \ldots, x_N\}$, and corresponding labels $\{y_1, \ldots, y_N\}$. For example, the observed input may comprise sensor data, e.g., image data. For example, the labels may classify the contents of the image data. For example, the images may represent road signs, and the labels may represent the type of road sign.

The system explained with reference to FIG. 4 learns to map an input data instance to an output. An output may comprise a label. An output may comprise vector, the multiple elements of which giving a probability for multiple labels. For example, the vector may sum to one, e.g., in case a single label prediction is desired. In general, an input data instance may be referred to as a 'point', meaning a point in the space of all possible input data instance.

In this embodiment, the observed inputs are split 413 into two sets: a training set 422 and a reference set 424. For example, the reference points: $R = \{x_1^r, \ldots, x_K^r\}$. For example, training points 422 may be: $M = \mathcal{D}_x \backslash R$. The splitting may be done randomly, for example, a random portion may be selected as reference points. A more general set-up is possible, e.g., as shown in FIG. 1, however, for simplicity, the above will be assumed here.

The training data may comprise any sensor data including one or more of: video, radar, LiDAR, ultrasonic, motion, etc. The resulting system can be used to compute a control signal for controlling a physical system. For example, the control signal may be for a computer-controlled machine, like a robot, a vehicle, a domestic appliance, a power tool, a manufacturing machine, a personal assistant or an access control system, etc. For example, the decision may be made based on a classification result. For example, in addition to, or instead of, an output, e.g., a classification result, the system may generate a confidence value. The confidence value, e.g., the predictive entropy, expresses whether the model thinks the input is likely to be from a particular class, e.g., indicated by low entropy, or whether the model is not sure, e.g., it thinks that all classes are equally probable, e.g., indicated by high entropy.

The confidence value may be used in controlling the physical system. For example, if confidence is low control may switch to a more conservative mode, e.g., lowering speed, lowering maneuverability, engaging human control, stopping a vehicle, and the like.

A machine learning system trained for classification may be comprised in a system for conveying information, such as a surveillance system or an imaging system, e.g., a medical imaging system. For example, the machine learning system may be configured for classifying the sensor data, e.g., to grant access to a system, e.g., by face recognition. Interestingly, the machine learning system allows for ambiguities in the observed data due to better indication of confidence.

System 300 may communicate, e.g., to receive inputs, training data, or to transmit outputs, and/or to communicate with external storage or input devices or output devices. This may be done over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna, etc.

Figure 3B:
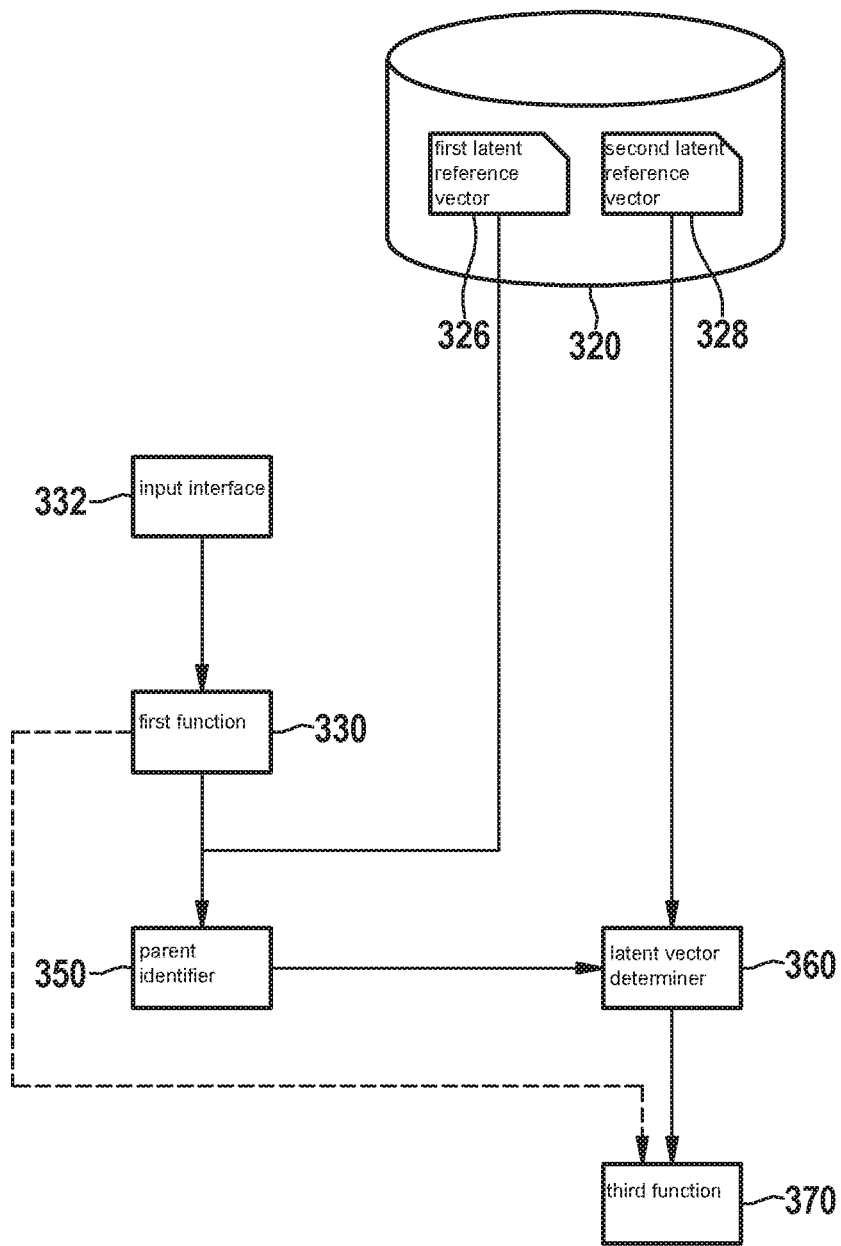
FIG. 3b schematically shows an example embodiment of a machine learning system configured for applying a machine learnable function.

The execution of system 300 is implemented in a processor system, e.g., one or more processor circuits, examples of which are shown herein. FIGS. 3a and 3b show functional units that may be functional units of the processor system. For example, FIGS. 3a and 3b may be used as a blueprint of a possible functional organization of the processor system. The processor circuit(s) are not shown separate from the units in these figures. For example, the functional units shown in FIGS. 3a and 3b may be wholly or partially implemented in computer instructions that are stored at system 300, e.g., in an electronic memory of system 300, and are executable by a microprocessor of system 300. In hybrid embodiments, functional units are implemented partially in hardware, e.g., as coprocessors, e.g., neural network coprocessors, and partially in software stored and executed on system 300. Parameters of machine learnable functions, e.g., neural networks and/or training data may be stored locally at system 300 or may be stored in cloud storage.

System 300 may be distributed over multiple devices, e.g., multiple devices for storage and/or computing. System 300 may be implemented in a single device. For example, the device may comprise a processor system for computing, and may comprise local storage or interfaces for external storage, e.g., cloud storage.

For example, machine learning system 300 may comprise a training storage 310. The training storage 310 may store training input data instances, or 'training points' and corresponding labels. FIG. 3a shows an input data instance 312 and a corresponding input label 314. For example, machine learning system 300 may comprise a reference storage 320. For example, reference storage 320 may store reference data instances, or reference points. Typically, training data is not needed after training but reference information may be needed, e.g., the reference points, or information derived from the reference points.

Reference storage 320 may store a reference label for all, or part, or none of the reference part. It is assumed, for simplicity, that a label is available for all reference inputs, but this is not necessary. For example, FIG. 3a shows a reference data instance 322 and corresponding reference label 324.

Typically, the split of observed inputs in training and reference data needs to be done just once. The number of reference points depends on the distribution, and may be found empirically. Generally speaking it is desirable that the reference points reflect the distribution of the training input well. As a starting point the number of reference points may be chosen as a multiple of the number of labels that are being predicted, e.g., 20 or 30 times more, etc. Different distribution may use more or fewer reference points for optimal performance.

To train the system, training inputs 422 as well as reference points 424 are mapped to a latent space U by a first function A, 431. As a result one obtains points $u_i$, 432 in latent space U and latent points $u_j$, 434 in space U. Points 434 are obtained from reference data instances, while points 432 are obtained from training data instances.

In an embodiment, function A, 431 is a machine learnable function, e.g., a neural network. For example, an image may be mapped to a vector, which may be of a smaller dimension. Latent space U may be multi-dimensional vector space.

Figure 2:
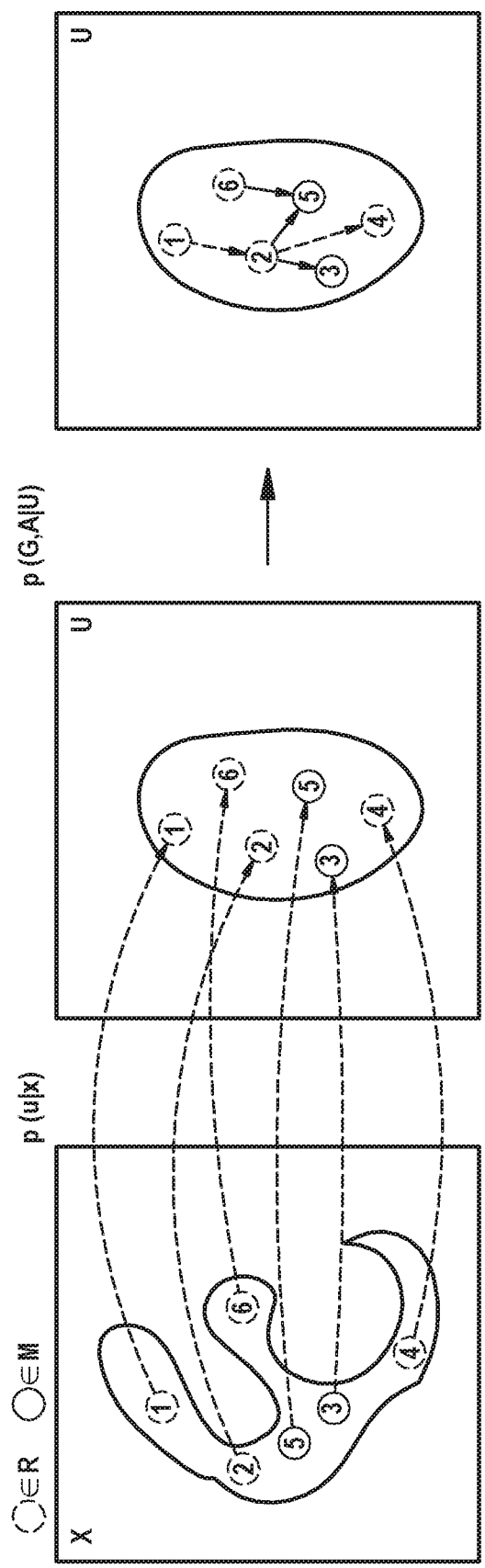
FIG. 2 schematically shows an example of a spaces and graphs related to an example embodiment of the present invention.

The mapping from the input space X to latent space U is illustrated in FIG. 2. In the left most picture the space X is shown comprising both training points and reference points. In the middle picture, both types of points are mapped to a latent space U.

For example, system 300 may comprise a first function 330, e.g., a first function unit, etc., configured to apply the first function A. Unit 330 may for example implement a neural network A. For example, first function 330 may be applied to training inputs, e.g., input data instances, as well as to reference inputs, e.g., reference data instance. For example, these data instances may comprise an image.

The latent vectors in space U are referred to as first latent vectors. Interestingly, the first latent vectors may be used to determine reference points that can be regarded as parents. Determining parents may be based on similarity between the first latent vectors. Interestingly, determining parents may be interpreted as determining a directed graph. In the case of first latent vectors that are obtained from training inputs, a bipartite graph is obtained: bipartite graph: $A: R \rightarrow M$, 442. (bipartite graph A is not be confused with first function 431). An edge in the bipartite graph indicates which elements of R are considered parents of which elements of M. For example, a directed edge from element j in R to element i in M indicates that j is a parent of i. Two arrows are shown in FIG. 4 towards graph 442, since the bipartite graph depends on the first latent vectors obtained from M as well as the first latent vectors obtained from R.

The first latent vectors 434 obtained from 424 may also have parents. In this case however, first latent vectors 434 correspond to reference data instances while the parents also correspond to reference data instances. Accordingly, the graph G that is induced is a graph on R. It was found that an improved system is obtained when care is taken to ensure that the graph is a directed acyclic graph (DAG).

FIG. 2 shows in the rightmost picture the bipartite graph A between training points and reference points and the DAG graph G between reference points.

To create a graph from first latent vectors, an edge can be drawn using a similarity function. In an embodiment, the similarity function generates a probability distribution for edges of the graph, e.g., a Bernoulli distribution for each edge. In particular, a conditional Bernoulli distribution may be used. For example, a distribution over a graph may be given by 1D variables U that are uniformly distributed and a conditional Bernoulli distributions for the edges E|U given U. The similarity function may be a kernel function. Accordingly, the graphs A and G, and thus the parents for a given first latent vector may be sampled from a distribution rather than determined deterministically. In an embodiment, one or both of the graphs A and G may have edges that are determined deterministically; e.g., an edge may be assumed if the similarity function exceeds a value.

For example, parent identifier 350 may be configured to select, e.g., sample, from R, e.g., from the reference points, given a first latent vector. For example, parent identifier 350 may be configured to identify a number of reference data instances in the set of reference data instances (R) as parents of the input data instance based upon a similarity between a first latent input vector and first latent reference vectors obtained from the set of reference data instances according to the first function (A). Accordingly, a reference data instance may correspond to first latent vector, a second latent vector, a point in graph A and a point in graph G. A training data instance may correspond to first latent vector, and a point in graph A. A second latent vector may be computed for the training data instance.

During training the first latent vectors for elements of R and M may be generated by applying first function 330. After training, the first latent vectors elements of R may be pre-computed and stored. For example, parent identifier 350 may be configured for an input latent vector to compute a similarity with the first latent vectors obtained for reference input data instance and to select parents probabilistically based upon the similarity. Parent identifier 350 may be configured to further filter using an ordering on the first latent vectors for R in case the input is itself an input of R, e.g., to ensure graph G is a DAG.

In practice, training may be batched. In an embodiment, a batch may comprise all reference points and part of the training points. Graph G may be computed, e.g., sampled, in full, whereas graph A may be computed, e.g., sampled, partially, e.g., in so far has induced by the training points in the batch. If the reference set is too large, one could also use a mini-batch for the reference set itself. Using the full set of reference points has the advantage of avoiding biased gradients, but batching training of R points allows a large reference set, e.g., which may be used to train a larger model.

Data augmentation may be used, e.g., when for training on images. For example, random geometric transform may be applied such as translations, rotations, scaling, etc., to prevent overfitting. In an embodiment, the reference points are slightly different in each batch due to the random transform.

The reference points 424 may be mapped to a second latent space Z, 436, e.g., using a second function 435, B. Second function 435, B may also be a machine learnable function. Second function 435 may be implemented in a second function 340 of system 300, e.g., a second function unit. In particular, second function B may be a neural network.

To train the system, the system mapping may be applied to a particular point 452. Mapping a particular point 452 to an output according to the system mapping may comprise determining the parent of point 452 in R. If point 452 is a training point this may use the bipartite graph A, if point 452 is a point in R this may use graph G. Point 452 is mapped to a point in the second latent space through its parents.

An element of second latent space Z for a particular point in M, may be obtained from the elements in Z computed for the reference points which are its parents. For example, the second latent vectors of the parent may be averaged. For training, the same may be done for elements in R. Even though an element of R already has an element in Z which is directly computed for it, an element 456, z of Z may be computed by averaging second latent vectors of parent just as may be done for M. In this way, a vector z in Z is obtained. Alternatively, computing a vector in the second latent space for a point in R may average of the parent according to graph G including the second latent vector of the point itself.

In an embodiment, the second function is also applied to training point to obtain a point the second latent space directly. This directly mapped point may be then be updated using the second latent vectors of its parent. For example, it may be averaged with it. A weighting factor may adjust the weight of the parent relative to the directly mapped vector. For example, a weighting factor of 1 may only use the second latent vectors of the parents, while a weighting factor of 0 may only use the second latent vectors directly obtained from the input instance. In an embodiment, the weighting factor is larger than 0, or at least 0.1, at least 0.5, etc.

Interestingly, z is obtained indirectly, in that a first latent space is used to identify related reference points, the parents, which are then used to determine a vector to represent the point of M with a point in Z. Accordingly, the system is forced to learn the structure of the reference points. For example, system 300 may comprise a latent vector determiner 360 which is configured to determine second latent vector for a point given second latent vectors of parent of the point. Note that, C maps from dimensionality of Z to K output dimensions, where K is number of all possible classes. Whereas A and B map from dimensionality of X to dimensionality of U and Z respectively. Increasing or decreasing the dimensionalities of U and Z leads to different model behavior.

Finally, a third function 437, C may be applied to vector z to produce the output. Third function C may be implemented in a third function 370, e.g., a third function unit. Also the third function may be neural network. In an implementation, the first, second and third function units may re-use a substantive amount of code, e.g., neural network implementation code. It is not needed that all of the first, second and third functions are neural networks. For example, the first function may map onto a feature vector. The latter mapping may be handcrafted. In an embodiment, the first, second, and third functions may be any learnable classification algorithm, e.g., random forests, support vector machine, etc. However, neural networks have proven to be versatile. Moreover, using a neural network for all three functions unifies the training over the three functions. The three functions can all be deep networks, e.g., convolutional networks, etc. However, it is not needed that all the networks are of equal size, for example, in an embodiment the neural network of function C may have fewer layers, than networks A and B.

Finally, the output, e.g., predicted label from z, 464, e.g., the output of unit 370 may be used to compute a training signal 466 for the trainable parts of system 300. For example, system 300 may comprise a training unit 380 configured to train system 300. For example, after a map a training input data instance is mapped to an output according to the system mapping, training unit 380 may be configured to derive a training signal from an error derived from the output, and to adjust the machine learnable functions according to the training signal. The learning algorithms may be specific to the machine learnable function, e.g., the learning algorithm may be backpropagation. The error may comprise or may be derived from a difference between the output and a prediction target. The error may also be obtained by a further computation, for example, for an auto-encoder or a cycle-GAN, e.g., a further learnable function may be used to reconstruct all or part of the input data instance. From the difference between the reconstructed input data instance and the actual input data instance an error may be computed.

In an embodiment, the third function (C) and at least one of the first function (A) and the second function (B) are machine learnable functions. In an embodiment, all three of functions, A, B and C are machine learnable functions. For example, they may all three be neural networks.

Note that training may also be done for reference points, although this is not necessary. In fact, the reference points do not need to have labels for the system to work, although an improved prediction was found in experiments when labels are provided for the reference points.

It was found to be advantageous if the system is stochastic, for example, determining parents may be done by drawing from a distribution, e.g., a Bernoulli distribution. For example, the output of the first function (A), second function (B), and/or third function (C), may be a probability distribution from which the respective output is sampled.

There are a number of variations that may be applied in system 300. For example, to derive the second latent vector, the second function B, may in addition to the reference points themselves also use a reference label as input. This is indicated in FIG. 3a with a dashed line from label 324 to function 340, and in FIG. 4 with a dashed line from labels 426 to latent space 436. This variation is possible because two latent spaces are used. For unknown inputs, just a mapping to the first latent space is needed, and so the second latent space may use labels in the mapping. Having labels as an input in the second latent space increase the predictive power of the second latent space.

To include labels 426 when mapping to second latent vector one may use a machine learnable function, e.g., a neural network, which takes as input both the reference data instance and the label. In a variant, two machine learnable functions are used, e.g., two neural networks. The first machine learnable function may map the reference data instance to the second latent space, while the second machine learnable function may map the label to the second latent space; then the two second latent vector may be added or averaged, possibly with a weighting applied. The weighing factor may be a learnable parameter.

Another variations which may be used together or instead of the former variant, is to provide the first latent vector of point 452 as a further input to the third function 370. This option is illustrated in FIG. 3a as a dotted line from first function 330 to third function 370. It was found that adding this additional vector increases the extrapolation power of the system. On the other hand, without this additional vector, the system reverts low-confidence predictions more strongly when provided with an o.o.d. input. Depending on the situation either may be preferred.

An advantage of embodiments is that the system reverts to default outputs, or close there to, when confronted with an o.o.d. input. For example, given an o.o.d. input, the input is likely to have no parents, and as a result be mapped on a default vector in the second latent space. The latter is then mapped to a default output or close thereto. Measuring how close the output is to a default output can be used to determine the confidence in the output.

For example, in an embodiment, the output of unit 370 may comprise multiple output probabilities for multiple labels. For example, if the inputs are road signs, the output of unit 370 may be vector indicating a probability for each possible road sign that can be recognized by the system. If one particular output is confidently recognized, e.g., a particular road sign, one probability will be high and the rest low, e.g., close to zero. If no particular output is confidently recognized then many or all probabilities will be approximately the equal. Thus the confidence in the output may be derived by measuring how close the output is from uniform—closer to uniform being less confident and further away from uniform being more confident. The confidence that the system has in its output may be reflected in a number in various ways; one way to do this is to compute the entropy of the generated probabilities.

In an embodiment, a confidence value may be derived from a unit 370 that does not use the first latent vector as input. This confidence value indicates how well the input was represented among training inputs. However, the output itself may be taken from a unit 370 that does use the first latent vector as input, so that the output has better extrapolation.

FIG. 3b schematically shows an example of an embodiment of a machine learning system configured for applying a machine learnable function.

After the system has been trained the system may be applied to new inputs, e.g., to input data instances that have not been seen during training. A machine learning system after training may be smaller than the system for training. An example, of a reduced system for applying the system mapping is shown in FIG. 3b.

FIG. 3b shows an input interface 332 arranged to obtain an input data instance. First function A, e.g., in first function unit 330 may be applied to the input data instance to obtain a first latent input vector in the first latent space.

Reference storage 320 may comprise reference data instances and corresponding labels, e.g., as in FIG. 3a. From these first and second latent reference vectors may be determined in the same way as in training. An advantage of this approach is that the first and second latent reference vectors may be properly sampled. For example storage 320 of FIG. 3a may be used as storage 320 in FIG. 3b as well. An alternative is possible, though at a possible loss of some accuracy, especially if applying the system mapping is repeated multiple times to increase accuracy. For example, reference storage 320 may comprise first latent reference vectors and second latent reference vectors that are precomputed using the trained first and second function. Shown is a first latent reference vector 326 and a second latent reference vector 328.

Using the first latent reference vectors the part of bipartite graph A that corresponds to first latent input vector may be sampled, e.g., a set of parents in R may be sampled. For example, the similarity function, e.g., a kernel function, may determine a probability that an edge between the first latent reference vector and a reference point is present; the edge can then be sampled accordingly. In this manner, a set of parent of the new first latent input instance may be obtained. For example, this may be done by a parent identifier 350.

Having the parents, a latent vector determiner 360, and a third function 370 may determine a latent vector z in the second latent space in the same manner as it may be done in training, e.g., by averaging the second latent reference vectors corresponding to the parents and applying the third function 370 to said average.

As in training, determining the first latent input vectors, its parents, and the output may be done by sampling a probability distribution. To increase accuracy this may be done multiple times and the results may be averaged.

The trained machine learning system, e.g., neural network system, may be applied in an autonomous device controller. For example, the input data of the system may comprise sensor data of the autonomous device. The autonomous device may perform movement at least in part autonomously, e.g., modifying the movement in dependence on the environment of the device, without a user specifying the modification. For example, the system may be a computer-controlled machine, like a car, a robot, a vehicle, a domestic appliance, a power tool, a manufacturing machine, etc. For example, the system may be configured to classify objects in the sensor data. The autonomous device may be configured for decision making depending on the classification. For example, the system may classify objects in the surrounding of the device and may stop, or decelerate, or steer or otherwise modify the movement of the device, e.g., if other traffic is classified in the neighborhood of the device, e.g., a person, cyclist, a car, etc.

In the various embodiments of system 300, the communication interfaces may be selected from various alternatives. For example, the interface may be a network interface to a local or wide area network, e.g., the Internet, a storage interface to an internal or external data storage, a keyboard, an application interface (API), etc.

The system 300 may have a user interface, which may include conventional elements such as one or more buttons, a keyboard, display, touch screen, etc. The user interface may be arranged for accommodating user interaction for configuring the system, training on a training set, or applying to new sensor data.

Storage may be implemented as an electronic memory, e.g., a flash memory, or magnetic memory, e.g., hard disk or the like; e.g., storage 310, 320 or storage for learnable parameters, etc. Storage may comprise multiple discrete memories together making up the storage. Storage may comprise a temporary memory, e.g., a RAM. The storage may be cloud storage.

System 300 may be implemented in a single device. Typically, system 300 comprises a microprocessor which executes appropriate software stored at the system; for example, that software may have been downloaded and/or stored in a corresponding memory, e.g., a volatile memory such as RAM or a non-volatile memory such as Flash. Alternatively, the system may, in whole or in part, be implemented in programmable logic, e.g., as field-programmable gate array (FPGA). The system may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, system 300 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 7:
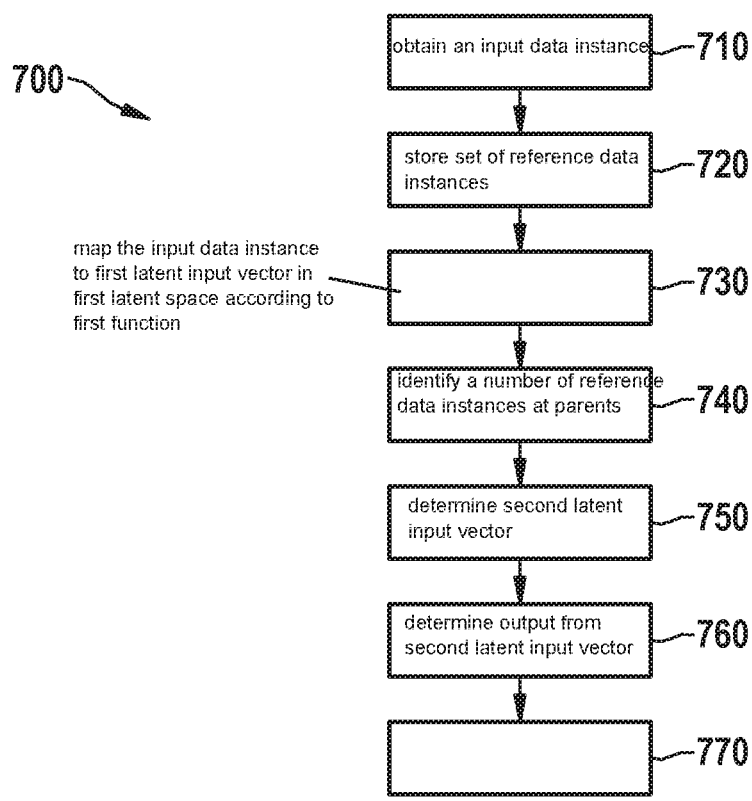
FIG. 7 schematically shows an example of an embodiment of a flowchart for an embodiment of a machine learning method according to the present invention.

FIG. 7 schematically shows an example of an embodiment of a flowchart for an embodiment of a machine learning method 700. Machine learning method (700) is configured to map an input data instance to an output according to a system mapping, the system mapping being composed from multiple functions. The machine learning method comprises

- obtaining (710) an input data instance,
- storing (720) a set of reference data instances (R),
- mapping (730) the input data instance to a first latent input vector in a first latent space (U) according to a first function (A),
- identifying (740) a number of reference data instances in the set of reference data instances (R) as parents of the input data instance based upon a similarity between the first latent input vector and first latent reference vectors obtained from the set of reference data instances according to the first function (A),
- determining (750) a second latent input vector (z) in a second latent space (Z) for the input data instance, from second latent reference vectors obtained according to a second function (B) from the number of reference data instances identified as parents,
- determining (760) an output from the second latent input vector (z) by applying a third function (C) to the second latent input vector, wherein the third function (C) and at least one of the first function (A) and the second function (B) are machine learnable functions.

For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc.

For example, the machine learning system and/or method may be configured for applying and/or training one or more neural networks. For example, applying a sequence of neural network layers to data of the training data, and/or adjusting the stored parameters to train the network may done using an electronic computing device, e.g., a computer.

A neural network, e.g., for functions A, B, or C, either during training and/or during applying may have multiple layers, which may include one or more projection layers, and one or more non-projection layers, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which includes instructions for causing a processor system to perform method 700. Software may just include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

Below further details, embodiments and variants are set out. An embodiment of the machine learning system and/or method may implement an embodiment of a machine learning process referred to herein as a Functional Neural Process (FNP). In the following examples it a supervised learning setup is assumed, where one is given tuples of points (x, y), with $x \in \chi$ being the input covariates and $y \in \mathcal{Y}$ being the given label. Let $\mathcal{D} = \{(x_1, y_1) \ldots, (x_N, y_N)\}$ be a sequence of N observed datapoints. Examples of partial supervised learning are provided. FNP may be adapted to fully unsupervised learning.

On a high level the FNP may posit a distribution over functions $h \in \mathcal{H}$ from x to y by first selecting a set of reference points from $\mathcal{X}$, and then basing the probability distribution over h around those points. More specifically, let $R = \{x_1^r, \ldots, x_K^r\}$ be such a reference set and let $O = \mathcal{X} \setminus R$ be the other set, e.g., the set of all possible points that are not in R. Now let $\mathcal{D}_x = \{x_1, \ldots, x_N\}$ be any finite random set from $\chi$, e.g., that constitutes the observed inputs. To facilitate the exposition two more sets are introduced; $M = \mathcal{D}_x \setminus R$ that contains the points of $\mathcal{D}_x$ that are from O and $B = R \cup M$ that contains all of the points in $\mathcal{D}_x$ and R. A Venn diagram is provided in FIG. 1. In the following a possible construction of the model is shown which is illustrated by FIG. 2. It can be proven that embodiments may be constructed that correspond to an infinitely exchangeable stochastic process.

The first step of the FNP may be to embed each of the $x_i$ of B independently to a latent representation $u_i$ $$p_\theta(U_B|X_B) = \Pi_{i \in B} p_\theta(u_i|x_i), \quad (3)$$

where $p_\theta(u_i|x_i)$ may be any distribution, e.g. a Gaussian or a delta peak, where its parameters, e.g. the mean and variance, are given by a function of $x_i$. This function may be any function, provided that it is flexible enough to provide a meaningful representation for $x_i$. For this reason, one may employ neural networks, as their representational capacity has been demonstrated on a variety of complex high dimensional tasks, such as natural image generation and classification.

The next step may be to construct a dependency graph among the points in B; it encodes the correlations among the points in $\mathcal{D}$ that arise in the stochastic process. For example, in GPs such a correlation structure may be encoded in the covariance matrix according to a kernel function $g(\bullet, \bullet)$ that measures the similarity between two inputs. In the FNP a different approach is adopted. Given the latent embeddings $U_B$ obtained in the previous step one may construct two directed graphs of dependencies among the points in B; a directed acyclic graph (DAG) G among the points in R and a bipartite graph A from R to M. These graphs may be represented as random binary adjacency matrices, where e.g. $A_{ij} = 1$ corresponds to the vertex i being a parent for the vertex j. The distribution of the bipartite graph may be defined as $$p(A|U_R, U_M) = \Pi_{i \in M} \Pi_{j \in R} \text{Bern}(A_{ij}|g(u_i, u_j)). \quad (4)$$

where $g(u_i, u_j)$ provides the probability that a point $i \in M$ depends on a point j in the reference set R. Note that the embedding of each node may preferably be a vector rather than a scalar and furthermore that the prior distribution over u may be conditioned on an initial vertex representation x rather than being the same for all vertices. The latter allows one to maintain enough information about the vertices and to construct more informative graphs.

The DAG among the points in R is a bit trickier. For example, one may adopt a topological ordering of the vectors in $U_R$ in order to avoid cycles. An ordering may be defined according to a parameter free scalar projection $t(\bullet)$ of u, e.g., $u_i > u_j$ when $t(u_i) > t(u_j)$. The function $t(\bullet)$ may be defined as $t(u_i) = \Sigma_k t_k(u_{ik})$ where each individual $t_k(\bullet)$ may be a monotonic function (e.g. the log CDF of a standard normal distribution); in this case one can guarantee that $u_i > u_j$ when individually for all of the dimensions k one has that $u_{ik} > u_{jk}$ under $t_k(\bullet)$. This ordering may then be used in $$p(G|U_R) = \Pi_{i \in R} \Pi_{j \in R, j \neq i} \text{Bern}(G_{ij}|\mathbb{I}[t(u_i) > t(u_j)] g(u_i, u_j)) \quad (5)$$

which leads into random adjacency matrices G that may be re-arranged into a triangular structure with zeros in the diagonal (e.g. DAGs). Note that this uses vector instead of scalar representations and that the prior over the representation of each vertex i depends on $x_i$. Any relational inductive biases that one wants for the function may be included by appropriately defining the $g(\bullet, \bullet)$ that is used for the construction of G and A. For example, one may encode an inductive bias that neighboring points should be dependent by choosing $$g(u_i, u_j) = \exp\left(-\frac{\tau}{2} \|u_i - u_j\|^2\right).$$

This worked well in practice. An example of a G that FNPs may learn is shown in FIG. 5. FIG. 5 schematically shows an example of a graph related to an embodiment. Shown in FIG. 5 is a DAG over R on MNIST data, obtained after propagating the means of U and thresholding edges that have less than 0.5 probability in G. It can be seen that the system learns a meaningful graph G by connecting points that have the same class. Note that in an embodiment the graph G, e.g., during training, the graph G may be sampled, e.g., sampled for each training batch.

Having obtained the dependency graphs A, G, a predictive model that induces them may be constructed. To this end, one may parametrize predictive distributions for each target variable $y_i$ that explicitly depend on the reference set R according to the structure of G and A. This may be realized via a local latent variable $z_i$ that summarizes the context from the selected parent points in R and their targets $y_R$ $$\int p_\theta(y_B, Z_B | R, G, A) dZ_B = \quad (6)$$

$$\int p_\theta(y_R, Z_R | R, G) dZ_R \int p_\theta(y_M, Z_M | R, y_R, A) dZ_M =$$

$$\prod_{i \in R} \int p_\theta(z_i | par_{G_i}(R, y_R)) p_\theta(y_i | z_i) dz_i$$

$$\prod_{j \in M} \int p_\theta(z_j | par_{A_j}(R, y_R)) p_\theta(y_j | z_j) dz_j$$

where $par_{G_i}(\bullet)$, $par_{A_j}(\bullet)$ are functions that return the parents of the point i, j according to G, A respectively. Notice that one is guaranteed that the decomposition to the conditionals at Eq. 6 is valid, since the DAG G coupled with A correspond to a directed tree. In this example, permutation invariance is desired, e.g., for an overall exchangeable model, then one may $_i|\text{par}_{A_i}(R, y_R))$, as an independent Gaussian distribution per dimension k of z.

$$p_\theta(z_{ik}|\text{par}_{A_i}(R,y_R)) = \mathcal{N}(z_{ik}|C_i\Sigma_{j\in R}A_{ij}\mu_\theta(x_j^r,y_j^r)_k, \exp(C_i\Sigma_{j\in R}A_{ij}v_\theta(x_j^r,y_j^r)_k)) \quad (7)$$

where the $\mu_\theta(\cdot,\cdot)$ and $v_\theta(\cdot,\cdot)$ are vector valued functions with a codomain in $\mathbb{R}^{|z|}$ that transform the data tuples of R, $y_R$. The $C_i$ may be a normalization constant with $C_i = (\Sigma_j A_{ij} + \in)^{-1}$, e.g., it corresponds to the reciprocal of the number of parents of point i, with an extra small $\in$ to avoid division by zero when a point has no parents. By observing Eq. 6 one may see that the prediction for a given $y_i$ depends on the input covariates $x_i$ only indirectly via the graphs G, A which are a function of $u_i$. Intuitively, it encodes the inductive bias that predictions on points that are "far away", e.g., have very small probability of being connected to the reference set via A, will default to an uninformative standard normal prior over $z_i$ hence a constant prediction for $y_i$. The factorized Gaussian distribution was chosen for simplicity, and it is not a limitation. Any distribution is valid for z provided that it defines a permutation invariant probability density w.r.t. the parents.

Nevertheless, Eq. 6 may also hinder extrapolation, something that neural networks can do well. In case extrapolation is important, one may add a direct path by conditioning the prediction on $u_i$, the latent embedding of $x_i$, e.g., $p(y_i|z_i, u_i)$. This may serve as a middle ground that allows some extrapolation via u. In general, it provides a knob, as one may interpolate between GP and neural network behaviors by, e.g., changing the dimensionalities of z and u.

Now, by putting everything together the overall definitions of the FNP and FNP$^+$ models are obtained:

$$\mathcal{F}\mathcal{N}\mathcal{P}_\theta(\mathcal{D}):=\Sigma_{G,A}\int p_\theta(U_B|X_B)p(G,A|U_B)p_\theta(y_B, Z_B|R,G,A)dU_B dZ_B d\mathcal{Y}_{i\in R\setminus \mathcal{D}_{x'}} \quad (8)$$

$$\mathcal{F}\mathcal{N}\mathcal{P}_f^+(\mathcal{D}):=\Sigma_{G,A}\int p_\theta(U_B,G,A|X_B)p_\theta(y_B,Z_B|R,U_B,G,A)dU_B dZ_B d\mathcal{Y}_{i\in R\setminus \mathcal{D}_{x'}} \quad (9)$$

where the first makes predictions according to Eq. 6 and the second further conditions on u. Notice that besides the marginalizations over the latent variables and graphs, one may also marginalize over any of the points in the reference set that are not part of the observed dataset $\mathcal{D}$. In this example, the reference set may be chosen to be a part of the dataset $\mathcal{D}$ so the extra integration may be omitted. In general, the marginalization can provide a mechanism to include unlabeled data to the model which may be used to e.g. learn a better embedding u or "impute" the missing labels. Having defined the models at Eq. 8, 9 one may prove that they both define valid permutation invariant stochastic processes, and hence correspond to Bayesian models.

Having defined the two models, their parameters $\theta$ may be fit, e.g., using a dataset $\mathcal{D}$, and subsequently the models may be used to make predictions for novel inputs $x^*$. For simplicity, it is assumed that $R \subseteq \mathcal{D}_x$, though this is not necessary. The description below focuses on the FNP as the derivations for the FNP$^+$ are analogous. Notice that in this case one has that $B = \mathcal{D}_x = X_\mathcal{D}$.

Fitting the model parameters with maximum marginal likelihood is difficult, as the necessary integrals/sums of Eq. 8 are intractable. For this reason, variational inference may be employed to maximize the following lower bound to the marginal likelihood of $\mathcal{D}$ $$\mathcal{L} = \mathbb{E}_{q_\phi(U_\mathcal{D},G,A,Z_\mathcal{D}|X_\mathcal{D})}[\log p_\theta(U^\mathcal{D},G,A,Z^\mathcal{D},\mathbf{y}_\mathcal{D}|X^\mathcal{D}) - \log q_\phi(U^\mathcal{D},G,A,Z^\mathcal{D}|X^\mathcal{D})], \quad (10)$$

with respect to the model parameters $\theta$ and variational parameters $\phi$. For a tractable lower bound, one may, e.g., assume that the variational posterior distribution $q_\phi(U_\mathcal{D}, G, A, Z_\mathcal{D}|X_\mathcal{D})$ factorizes as $p_\theta(U^\mathcal{D}|X^\mathcal{D})p(G|U_R)p(A|U^\mathcal{D})q_\phi(Z^\mathcal{D}|X^\mathcal{D})$ with $q_\phi(Z^\mathcal{D}|X^\mathcal{D}) = \Pi_{i=1}^{|\mathcal{D}|} q_\phi(z_i|x_i)$. This leads to $$\mathcal{L}_R + \mathcal{L}_{M|R} = \mathbb{E}_{p_\theta(U_R,G|X_R)q_\phi(Z_R|X_R)}[\log p_\theta(y_R,Z_R|R,G) - \log q_\phi(Z_R|X_R)] + \mathbb{E}_{p_\theta(U_\mathcal{D},A|X_\mathcal{D})q_\phi(Z_M|X_M)}[\log p_\theta(y_M|Z_M) + \log p_\theta(Z_M|\text{par}_A(R,y_R)) - \log q_\phi(Z_M|X_M)] \quad (11)$$

where the lower bound is decomposed into the terms for the reference set R, $\mathcal{L}_R$, and the terms that correspond to M, $\mathcal{L}_{M|R}$. For large datasets $\mathcal{D}$ efficient optimization of this bound is possible. While the first term may not, in general, be amenable to minibatching, the second term is. As a result, one may use minibatches that scale, e.g., according to the size of the reference set R.

In practice, for all of the distributions over u and z, one may use diagonal Gaussians, whereas for G, A one may use the concrete/Gumbel-softmax relaxations during training. In this way, the parameters $\theta$, $\phi$ can be optimize jointly, e.g., with gradient based optimization by employing the pathwise derivatives obtained with the reparametrization trick. Furthermore, most of the parameters $\theta$ may be tied to the model and $\phi$ of the inference network, as the regularizing nature of the lower bound can alleviate potential overfitting of the model parameters $\theta$. More specifically, for $p_\theta(u_i|x_i)$, $q_\phi(z_i|x_i)$ a neural network torso may be shared having two output heads, one for each distribution. The priors over the latent z may also be parametrize in terms of the $q_\phi(z_i|x_i)$ for the points in R; the $\mu_\theta(x_i^r, y_i^r)$, $v_\theta(x_i^r, y_i^r)$ may both be defined as $\mu_q(x_i^r) + \mu_y^r$, $v_q(x_i^r) + v_y^r$, where $\mu_q(\cdot)$, $v_q(\cdot)$ are the functions that provide the mean and variance for $q_\phi(z_i|x_i)$ and $\mu_y^r$, $v_y^r$ are linear embeddings of the labels. Predicting the label $y_i$ of a given point $x_i$ may be done from its latent code $z_i$ where the prior, instead of being globally the same, may be conditioned on the parents of that particular point. The conditioning may convert the i.i.d. to the more general exchangeable model.

In order to perform predictions for unseen points $x^*$, one may employ the posterior predictive distribution of FNPs. More specifically, one can show that by using Bayes rule, the predictive distribution of the FNPs has the following form $$\Sigma_{a^*}\int p_\theta(U_R,u^*|X_R,x^*)p(a^*|U_R,u^*)p_\theta(z^*|\text{par}_{a^*}(R,y_R))p_\theta(y^*|z^*)dU_R du^* dz^* \quad (12)$$

where u are the representations given by the neural network and a* may be the binary vector that denotes which points from R are the parents of the new point. For example, one may first project the reference set and the new point on the latent space u with a neural network and then make a prediction y* by basing it on the parents from R according to a*.

FIGS. 6a-6e schematically shows an example of predicted distributions for a regression task.

A number of experiments were performed in order to verify the effectiveness of FNPs, two of which are described herein. Comparisons were made against 3 baselines: a standard neural network (denoted as NN), a neural network trained and evaluated with Monte Carlo (MC) dropout and a Neural Process (NP) architecture. For the first experiment the inductive biases that can be encoded in FNPs were explored by visualizing the predictive distributions in a 1d regression task. For the second, the prediction performance was measured and uncertainty quality that FNPs can offer on the benchmark image classification tasks of MNIST. Experiments on CIFAR 10 were also performed.

Figure 6A:
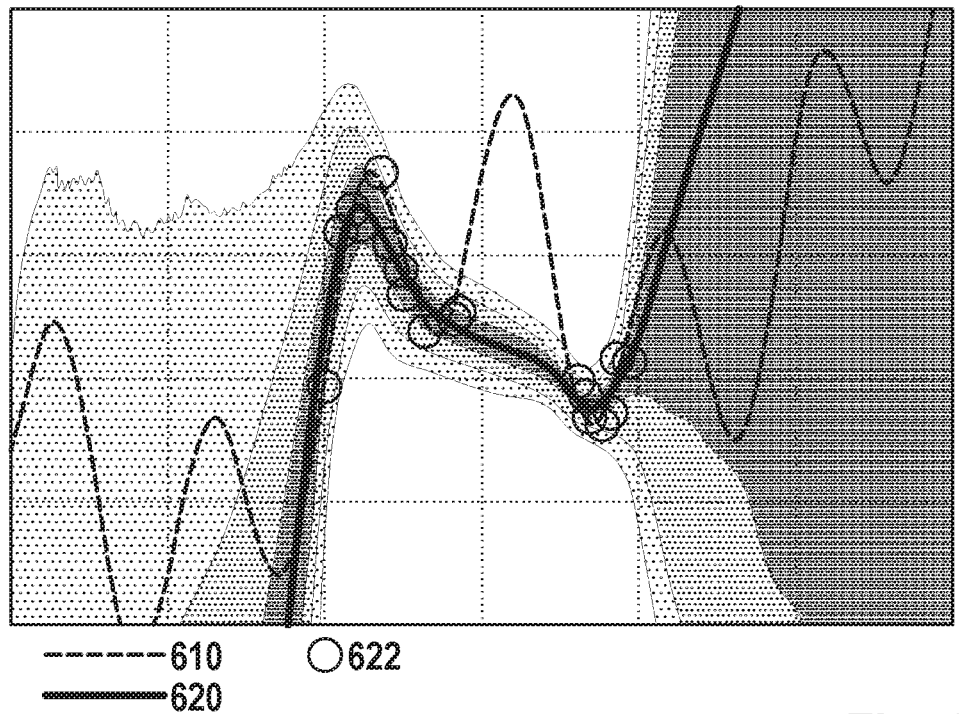
FIGS. 6a-6c schematically show an example of predicted distributions for a regression task for baselines methods.
Figure 6B:
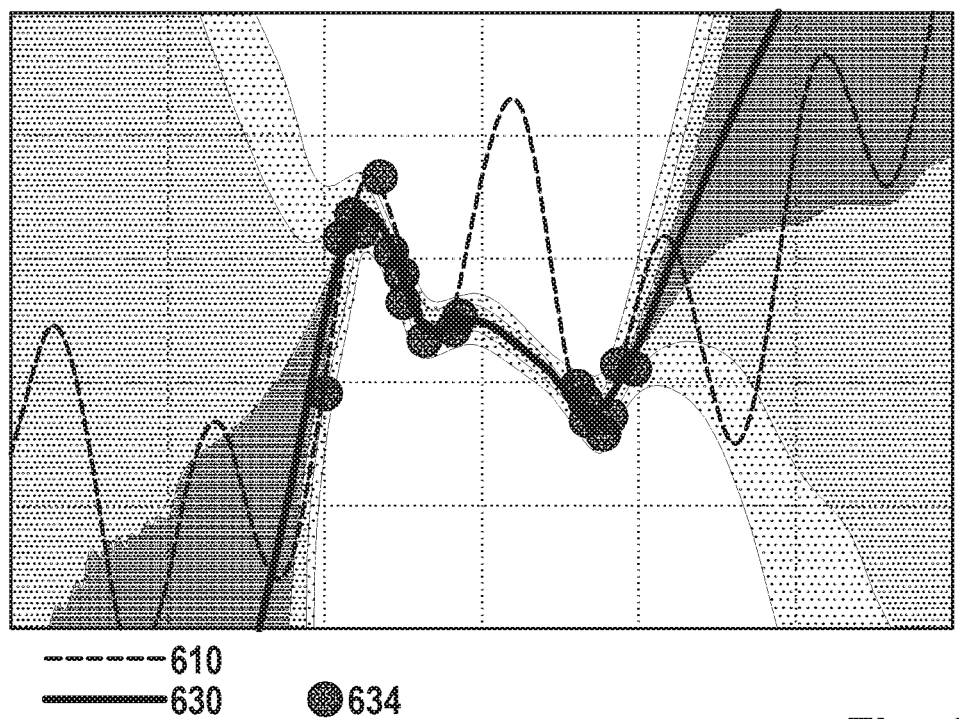
Figure 6C:
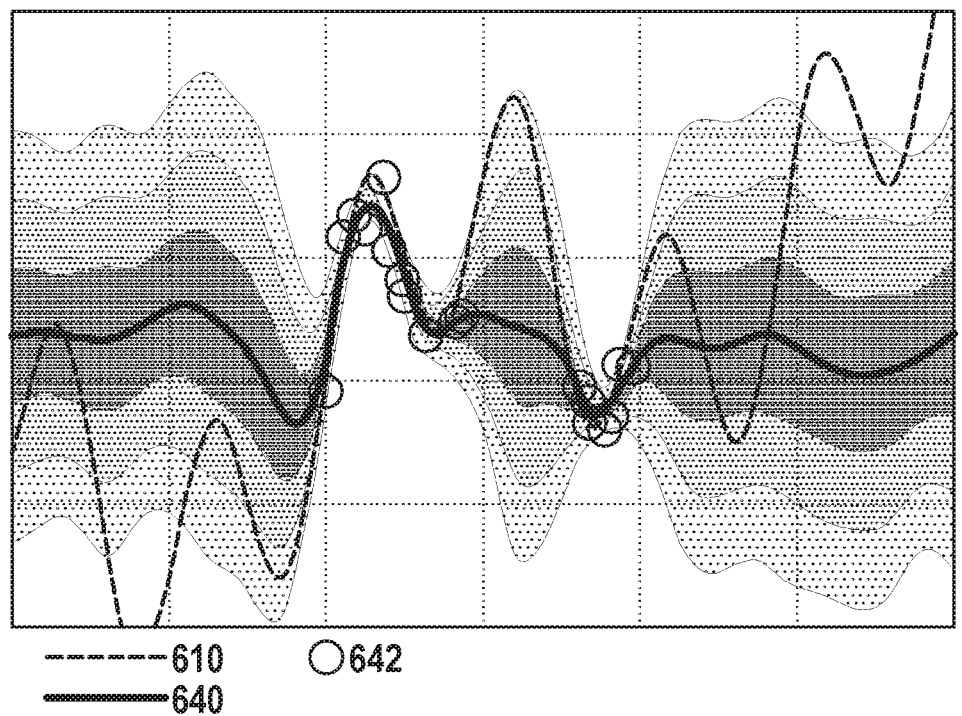
Figure 6D:
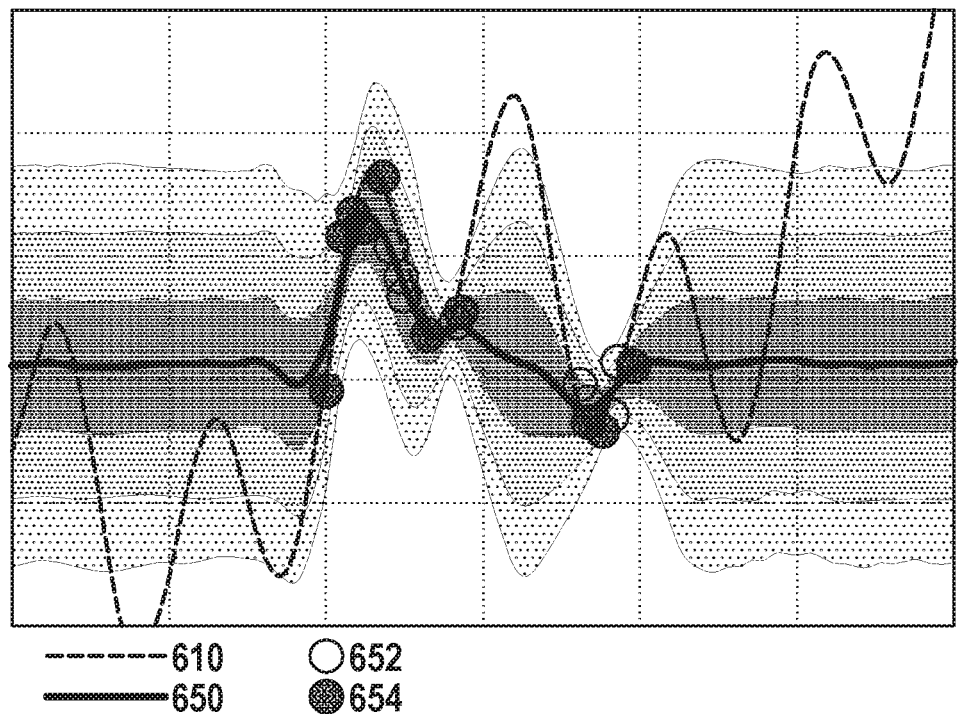
FIGS. 6d-6e schematically show an example of predicted distributions for an embodiment according to the present invention.
Figure 6E:
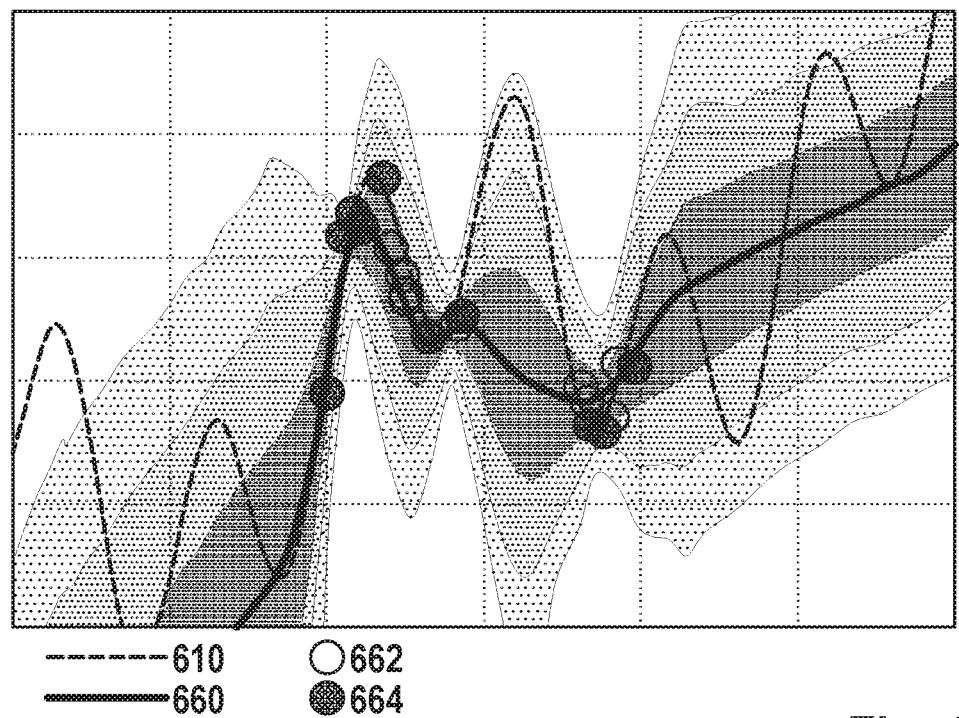

FIG. 6a relates to MC-dropout. FIG. 6b relates to Neural Process. FIG. 6c relates to Gaussian Process. FIGS. 6d and 6e relates to an embodiment. In case of FIG. 6e the first latent vector of the input data instance was used as an additional input to the third function. Predictive distributions for the regression task according to the different models were considered. Shaded areas correspond to ±3 standard deviations.

The generative process corresponds to drawing 12 points from U[0,0.6], 8 points from U[0.8,1] and then parametrizing the target as $y_i = x_i + \in + \sin(4(x_i + \in))\sin(13(x_i + \in))$ with $\in \sim \mathcal{N}(0, 0.03^2)$. This generates a nonlinear function with "gaps" in between the data where one would want the uncertainty to be high. For all of the models a heteroscedastic noise model was used. A Gaussian Process (GP) with an RBF kernel was also included. For the global latent of NP 50 dimensions were used and 3,50 dimensions for the u, z latents of the FNPs. For the reference set R 10 random points were used for the FNPs and the full dataset for the NP.

One can see that the FNP with the RBF function for $g(\bullet,\bullet)$ has a behavior that is similar to the GP. This is not the case for MC-dropout or NP where a more linear behavior is seen on the uncertainty and erroneous overconfidence in the areas in-between the data. Nevertheless, they do seem to extrapolate better whereas FNP and GP default to a flat zero prediction outside of the data. The FNP$^+$ seems to combine the best of both worlds as it allows for extrapolation and GP like uncertainty, although a free bits modification of the bound for z was helpful in encouraging the model to rely more on these particular latent variables. Empirically, it was observed that adding more capacity on u may move the FNP$^+$ closer to the behaviour that is observed for MC-dropout and NPs. In addition, increasing the amount of model parameters θ may make FNPs overfit, a fact that can result into a reduction of predictive uncertainty.

For the second task image classification of MNIST and CIFAR 10 was considered. For MNIST a LeNet-5 architecture was used that had two convolutional and two fully connected layers, whereas for CIFAR a VGG-like architecture was used that had 6 convolutional and two fully connected. In both experiments 300 random points were used from $\mathcal{D}$ as R for the FNPs and for NPs, in order to be comparable, up to 300 points were randomly selected from the current batch for the context points during training and the same 300 points were used as FNPs for evaluation. The dimensionality of u, z was 32,64 for the FNP models in both datasets, whereas for the NP the dimensionality of the global variable was 32 for MNIST and 64 for CIFAR.

As a proxy for the uncertainty quality an out of distribution (o.o.d.) detection task was given; given the fact that FNPs are Bayesian models one would expect that their epistemic uncertainty will increase in areas where one has no data (e.g. o.o.d. datasets). The metric that is reported is the average entropy on those datasets as well as the area under an ROC curve (AUCR) that determines whether a point is in or out of distribution according to the predictive entropy. Notice that it is simple to increase the first metric by just learning a trivial model but that would be detrimental for AUCR; in order to have good AUCR the model must have low entropy on the in-distribution test set but high entropy on the o.o.d. datasets. For the MNIST model the o.o.d. datasets considered were: notMNIST, Fashion MNIST, Omniglot, Gaussian $\mathcal{N}(0,1)$ and uniform U[0,1] noise; whereas for CIFAR 10 the used sets were: SVHN, a tinyImagenet resized to 32 pixels, iSUN and similarly Gaussian and uniform noise. A summary of the results for MNIST can be seen at Table 1.

TABLE 1

Accuracy and uncertainty on MNIST from 100 posterior predictive samples. For the all of the datasets the first column is the average predictive entropy whereas for the o.o.d. datasets the second is the AUCR and for the in-distribution it is the test error in %.

|  | NN | MC-Dropout | NP | FNP | FNP$^+$ |
|---|---|---|---|---|---|
| MNIST | 0.01/0.6 | 0.05/0.5 | 0.01/0.6 | 0.04/0.7 | 0.02/0.7 |
| nMNIST | 1.03/99.73 | 1.30/99.48 | 1.31/99.90 | 1.94/99.90 | 1.77/99.96 |
| fMNIST | 0.81/99.16 | 1.23/99.07 | 0.71/98.98 | 1.85/99.66 | 1.55/99.58 |
| Omniglot | 0.71/99.44 | 1.18/99.29 | 0.86/99.69 | 1.87/99.79 | 1.71/99.92 |
| Gaussian | 0.99/99.63 | 2.03/100.0 | 1.58/99.94 | 1.94/99.86 | 2.03/100.0 |
| Uniform | 0.85/99.65 | 0.65/97.58 | 1.46/99.96 | 2.11/99.98 | 1.88/99.99 |
| Average | 0.9 ± 0.1/ 99.5 ± 0.1 | 1.3 ± 0.2/ 99.1 ± 0.4 | 1.2 ± 0.2/ 99.7 ± 0.2 | 1.9 ± 0.1/ 99.8 ± 0.1 | 1.8 ± 0.1/ 99.9 ± 0.1 |

It may be seen that both FNPs have comparable accuracy to the baseline models while having higher average entropies and AUCR on the o.o.d. datasets. FNP$^+$ in general seems to perform better than FNP. One may see that the FNPs have almost always better AUCR than all of the baselines that were considered. Interestingly, out of all the non-noise o.o.d. datasets it was observe that Fashion MNIST and SVHN, were the hardest to distinguish on average across all the models. It was also observed that, sometimes, the noise datasets on all of the baselines can act as "adversarial examples" thus leading to lower entropy than the in-distribution test set. FNPs did have a similar effect on CIFAR 10, e.g. the FNP on uniform noise, although to a much lesser extent. It should be mentioned that other advances in o.o.d. detection are orthogonal to FNPs and could further improve performance.

As for the trade-off between z, u in FNP$^+$; a larger capacity for z, compared to u, leads to better uncertainty whereas the other way around seems to improve accuracy. These observations are conditioned on having a reasonably large u in order to learn a meaningful G, A.

The architectures for the FNP and FNP$^+$ in the above experiments were constructed as follows. A neural network torso was used in order to obtain an intermediate hidden representation h of the inputs x and then parametrized two linear output layers, one that lead to the parameters of p(u|x) and one that lead to the parameters of q(z|x), both of which were fully factorized Gaussians. The function $g(\bullet,\bullet)$ for the Bernoulli probabilities was set to an RBF, e.g. $g(u_i, u_j) = \exp(-0.5\tau\|u_i - u_j\|^2)$, where τ was optimized to maximize the lower bound. The temperature of the binary concrete/Gumbel-softmax relaxation was kept at 0.3 throughout training and the log CDF of a standard normal was used as the $\tau_k(\bullet)$ for G. For the classifiers p(y|z), p(y|z, u) a linear model was used that operated on top of ReLU(z) or ReLU([z, u]) respectively. A single Monte Carlo sample was used for each batch during training in order to estimate the bound of FNPs. A single sample was used for the NP and MC-dropout. All of the models were implemented in PyTorch and were run across five Titan X (Pascal) GPUs (one GPU per model).

The NN and MC-dropout had the same torso and classifier as the FNPs. The NP was designed with the same neural network torso to provide an intermediate representation h for the inputs x. To obtain the global embedding r the labels y were concatenated to obtain h̃=[h, y], projected h̃ to 256 dimensions with a linear layer and then computed the average of each dimension across the context. The parameters of the distribution over the global latent variables θ were then given by a linear layer acting on top of ReLU(r). After sampling θ a linear classifier was used that operated on top of [h, ReLU(θ)]. The regression experiment for the initial transformation of x used 100 ReLUs for both NP and FNP models via a single layer MLP, whereas the regressor used a linear layer for NP (more capacity lead to overfitting and a decrease in predictive uncertainty) and a single hidden layer MLP of 100 ReLUs for the FNPs. The MC-dropout network used a single hidden layer MLP of 100 units and applying dropout with a rate of 0.5 at the hidden layer. In all of the neural networks models, the heteroscedastic noise was parametrized according to σ=0.1+0.9 log(1+exp(d)), where d was a neural network output. For the GP, the kernel lengthscale was optimized according to the marginal likelihood. It was beneficial to apply a soft-free bits modification of the bound to help with the optimization of z, where initially 1 free bit was allowed on average across all dimensions and batch elements for the FNP and 4 for the FNP+ both of which were slowly annealed to zero over the course of 5 k updates.

For the MNIST experiment, the model architecture was a 20C5-MP2-50C5-MP2-500FC-Softmax, where 20C5 corresponds to a convolutional layer of 20 output feature maps with a kernel size of 5, MP2 corresponds to max pooling with a size of 2, 500FC corresponds to fully connected layer of 500 output units and Softmax corresponds to the output layer. The initial representation of x for the NP and FNPs was provided by the penultimate layer of the network. For the MC-dropout network 0.5 dropout was applied to every layer. The number of points in R was set to 300, a value that was determined from a range of [50,100,200,300,500] by judging the performance of the NP and FNP models on the MNIST/notMNIST pair. For the FNP minibatches of 100 points were used from M, always appending the full R to each of those batches. For the NP, a batch size of 400 points was used, where, in order to be comparable to the FNP, up to 300 randomly selected points from the current batch were used for the context points during training and used the same 300 points as FNP for evaluation. The upper bound of training epochs for the FNPs, NN and MC-dropout networks was set to 100 epochs, and 200 epochs for the NP as it did less parameter updates per epoch than the FNPs. Optimization was done with Adam using the default hyperparameters. Early stopping was done according to the accuracy on the validation set and no other regularization was employed. Finally, a soft-free bits modification was employed of the bound to help with the optimization of z, where 1 free bit was allowed on average across all dimensions and batch elements throughout training.

The architecture for the CIFAR 10 experiment was a 2x(128C3)-MP2-2x(256C3)-MP2-2x(512C3)-MP2-1024FC-Softmax along with batch normalization employed after every layer (besides the output one). Similarly to the MNIST experiment, the initial representation of x for the NP and FNPs was provided by the penultimate layer of each of the networks. Hyperparameters were not optimized for these experiments and used the same number of reference points, free bits, amount of epochs, regularization and early stopping criteria were used at MNIST. For the MC-dropout network a dropout was applied with a rate of 0.2 at the beginning of each stack of convolutional layers that shared the same output channels and with a rate of 0.5 before every fully connected layer. Optimization was done with Adam with an initial learning rate of 0.001 that was decayed by a factor of 10 every thirty epochs for the NN, MC-Dropout and FNPs and every 60 epochs for the NP. Data augmentation was performed during training by doing random cropping with a padding of 4 pixels and random horizontal flips for both the reference and other points. Data augmentation was not used during test time. The images were further normalized by subtracting the mean and by dividing with the standard deviation of each channel, computed across the training dataset.

As mentioned above, the objective of FNPs may be amenable to minibatching where the size of the batch scales according to the reference set R. The procedure for the FNP as the extension for FNP+ may be similar. The bound of FNPs may be expressed into two terms:

$$\mathcal{L} = \mathbb{E}_{q_\phi(Z_R|X_R)p_\theta(U_R,G|X_R)}[\log p_\theta(y_R, Z_R | R, G) - \log q_\phi(Z_R | X_R)] + + \quad (23)$$
$$\mathbb{E}_{p_\theta(U_D,A|X_D)q_\phi(Z_M|X_M)}[\log p_\theta(y_M | Z_M) +$$
$$\log p_\theta(Z_M | par_A(R, y_R)) - \log q_\phi(Z_M | X_M)] = \mathcal{L}_R + \mathcal{L}_{M|R},$$

where one has a term that corresponds to the variational bound on the datapoints in R, $\mathcal{L}_R$, and a second term that corresponds to the bound on the points in M when conditioned on R, $\mathcal{L}_{M|R}$. While the $\mathcal{L}_R$ term of Eq. 23 cannot, in general, be decomposed to independent sums due to the DAG structure in R, the $\mathcal{L}_{M|R}$ term can; from the conditional i.i.d. nature of M and the structure of the variational posterior may be expressed as M independent sums:

$$\mathcal{L}_{M|R} = \mathbb{E}_{p_\theta(U_R|X_R)}[\Sigma_{i=1}^{|M|} \mathbb{E}_{p_\theta(u_i,A_i|x_i,U_R)q_\phi(z_i|x_i)}[\log p_\theta(y_i,z_i|par_{A_i}(R,y_R)) - \log q_\phi(z_i|x_i)]]. \quad (24)$$

A minibatch $\hat{M}$ of points from M may be used in order to approximate the inner sum and thus obtain unbiased estimates of the overall bound that depend on a minibatch {R, $\hat{M}$}:

$$\tilde{\mathcal{L}}_{M|R} = \mathbb{E}_{p_\theta(U_R|X_R)}\left[\frac{\hat{M}}{M}\sum_{i=1}^{|\hat{M}|}\mathbb{E}_{p_\theta(u_i,A_i|x_i,U_R)q_\phi(z_i|x_i)}[\log p_\theta(y_i,z_i|par_{A_i}(R,y_R)) - \log q_\phi(z_i|x_i)]\right], \quad (25)$$

thus obtain the following unbiased estimate of the overall bound that depends on a minibatch {S, $\hat{M}$}

$$\mathcal{L} \approx \mathcal{L}_R + \tilde{\mathcal{L}}_{M|R}. \quad (26)$$

In practice, this might limit us to use relatively small reference sets as training may become relatively expensive; in this case an alternative would be to subsample also the reference set and just reweigh appropriately $\mathcal{L}_R$. This may provide a biased gradient estimator but, was found to work as well.

It will be appreciated that the present invention ter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the means of at least one of the systems and/or products set forth.

Figure 8A:
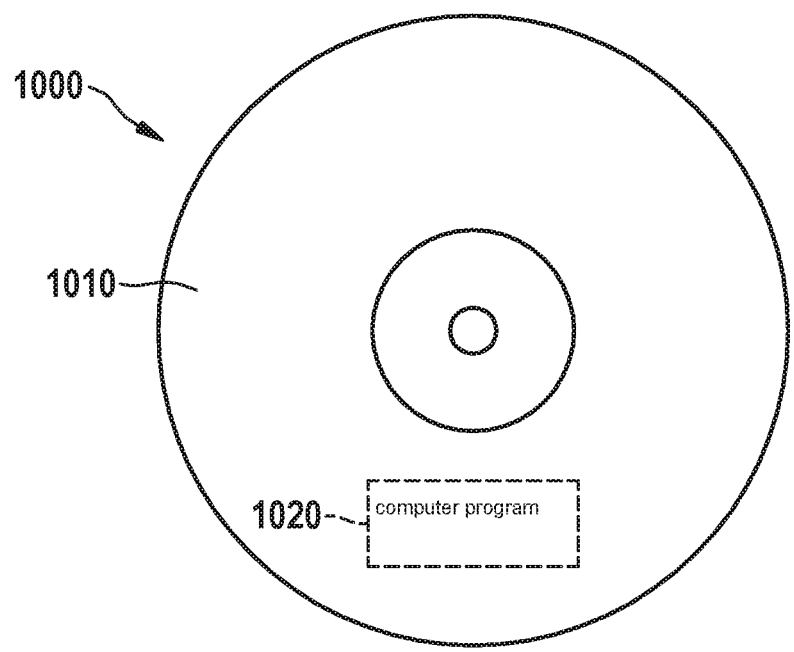
FIG. 8a schematically shows a computer readable medium having a writable part including a computer program according to an embodiment according to the present invention.

FIG. 8a shows a computer readable medium 1000 having a writable part 1010 including a computer program 1020, the computer program 1020 including instructions for causing a processor system to perform a method of machine learning, e.g., of training and/or applying neural networks, according to an embodiment. The computer program 1020 may be embodied on the computer readable medium 1000 as physical marks or by magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform the method of training and/or applying a neural network.

Figure 8B:
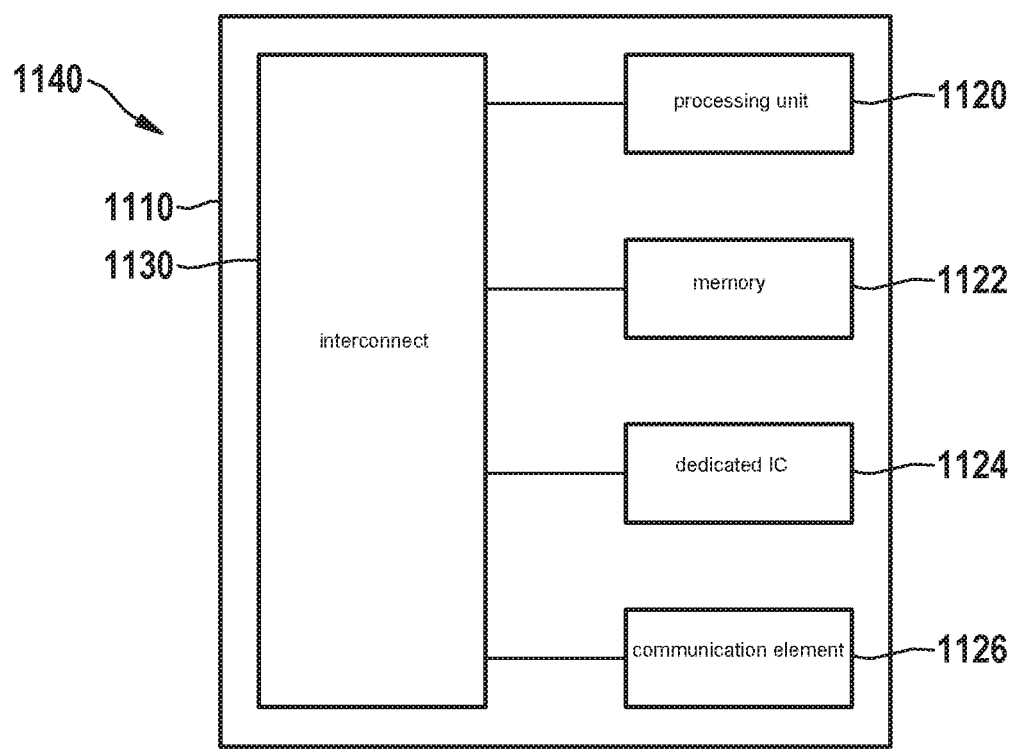
FIG. 8b schematically shows a representation of a processor system according to an embodiment according to the present invention.

FIG. 8b shows in a schematic representation of a processor system 1140 according to an embodiment of a method of machine learning, e.g., of training and/or applying neural networks, and/or according to a machine learning system. The processor system includes one or more integrated circuits 1110. The architecture of the one or more integrated circuits 1110 is schematically shown in FIG. 8b. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, e.g., a bus. The processor system 1110 may be arranged for contact and/or contact-less communication, using an antenna and/or connectors, respectively.

For example, in an embodiment, processor system 1140, e.g., the training and/or application device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the present invention, and that those skilled in the art will be able to design many alternative embodiments.

Herein, use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The present invention may be implemented by hardware including several distinct elements, and by a suitably programmed computer. In the device of the present invention enumerated by several parts, several of these parts may be embodied by one and the same item of hardware. The mere fact that certain measures are described mutually separately does not indicate that a combination of these measures cannot be used to advantage.

LIST OF REFERENCE NUMERALS 300 machine learning system
310 a training storage
312 an input data instance
314 an input label
320 a reference storage
322 a reference data instance
324 a reference label
326 a first latent reference vector
328 a second latent reference vector
332 an input interface arranged to obtain an input data instance
330 a first function
350 a parent identifier
340 a second function
360 a latent vector determiner
370 a third function
380 a training unit
412 observed inputs: $\mathcal{D}_x=\{x_1, \ldots, x_N\}$, and labels $\{y_1, \ldots, y_N\}$
413 split
422 training points: $M=\mathcal{D}_x\backslash R$
424 reference points: $R=\{x_1^r, \ldots, x_K^r\}$
426 labels of reference points
431 a first function A
432 latent space U: points $u_i$
434 latent space U: points $u_j$
435 a second function B
436 latent space Z
437 a third function C
442 bipartite graph: $A:R\rightarrow M$
444 DAG: $G:R\rightarrow R$
452 training point (from M or R)
454 parents in R (obtained from A or G)
456 latent vector z obtained from parent latent vectors
464 predicted label from z
466 training signal for functions A, B and/or C
610 true function
620 mean function
622 observations
630 mean function
634 observations
640 mean function
642 observations
650 mean function
652 observations
654 reference points
660 mean function
662 observations
664 reference points
1000 a computer readable medium 1010 a writable part
1020 a computer program
1110 integrated circuit(s)
1120 a processing unit
1122 a memory
1124 a dedicated integrated circuit
1126 a communication element
1130 an interconnect
1140 a processor system

What is claimed is:

1. A machine learning system for an autonomous device, the machine learning system configured to classify objects represented in input data instances, the machine learning system comprising:
   an input interface configured to obtain the input data instances, the input data instances including sensor data from a sensor of the autonomous device, the sensor detecting an environment of the autonomous device, the autonomous device including at least one of: a vehicle, or a robot;
   a storage element configured to store a set of reference data instances, the set of reference data instances including reference sensor data; and
   a processor circuit configured to perform a method of classifying the objects represented in the input data instances, including:
      mapping the input data instances to first latent input vectors in a first latent space according to a first function,
      determining similarities between the first latent input vectors and first latent reference vectors, the first latent reference vectors obtained according to the first function from the set of reference data instances;
      for a first input data instance of the input data instances:
         identifying a number of reference data instances in the set of reference data instances as parents of the first input data instance based upon at least one of the determined similarities,
         determining a second latent input vector in a second latent space for the first input data instance from second latent reference vectors, the second latent reference vectors obtained according to a second function from the number of reference data instances identified as parents,
         determining a first output from the second latent input vector by applying a third function to the second latent input vector, the output including a classification of an object of the objects, represented in the sensor data, in the environment of the autonomous device, the classification classifying the object as at least one of: a second vehicle, a person, or a cyclist,
      wherein the third function and at least one of the first function and the second function are machine learnable functions; and
      generating a control signal to automatically modify a movement of the autonomous device as a function of the classification of the object, where the modifying of the movement includes at least one of: stopping the autonomous device, decelerating the autonomous device, or steering the autonomous device; and
      for a second input data instance of the plurality of input data instances:
         identifying that no parents of the second input data instance exist as reference data instances in the set of reference data instances based on the determined similarities;
         determining a default second latent input vector in the second latent space; and
         determining a default output based on the default second latent input vector.

2. The machine learning system as recited in claim 1, wherein the input data instance and the reference data instances each include sensor data, the sensor data including an image.

3. The machine learning system as recited in claim 1, wherein the output includes an output label.

4. The machine learning system as recited in claim 1, wherein at least one of the first function, the second function, and the third function, are a neural network.

5. The machine learning system as recited in claim 1, wherein the similarity between the first latent input vector and the first latent reference vector is determined according to a kernel function.

6. The machine learning system as recited in claim 5, wherein at least one of the first function, the second function, the third function, and the kernel function, are configured to produce a probability distribution from which the output is sampled.

7. The machine learning system as recited in claim 1, further configured for training the machine learnable functions,
   wherein the processor circuit is configured to:
      map a training input data instance to an output;
      derive a training signal from an error derived from the output; and
      adjust the machine learnable functions according to the training signal.

8. The machine learning system as recited in claim 7, wherein training is batched, the processor system being configured to:
   sample a directed acyclic graph from the reference data instances;
   select a batch of training points and sample a corresponding part of bipartite graph; and
   apply the system mapping to the reference data instances and the batch of training points to obtain multiple training signals.

9. The machine learning system as recited in claim 1, further configured for training the machine learnable functions,
   wherein the processor circuit is configured to:
      select a reference data instance from the set of reference data instances and identify a number of reference data instances in the set of reference data instances as parents of the selected reference data instance based upon a similarity between a first latent reference vector obtained from the selected reference data instance according to the first function and the first latent reference vectors.

10. The machine learning system as recited in claim 1, wherein the second latent input vector determined for the reference data instance further depends on a corresponding reference label.

11. The machine learning system as recited in claim 1, wherein the third function is configured to take as input the second latent input vector and the first latent input vector to produce the output.

12. The machine learning system as recited in claim 1, wherein the output includes multiple output labels and multiple corresponding output probabilities, the processor circuit being configured to compute a confidence value from the multiple output probabilities.

13. The machine learning system as recited in claim 1, wherein an initial second latent reference vector is obtained for the input data instance by applying the second function to the input data instance, the second latent input vector in the second latent space being obtained for the input data instance from the initial second latent reference vector and the second latent reference vectors, the second latent reference vectors obtained for the reference data instances identified as parents.

14. The machine learning system as recited in claim 1, wherein the method further includes
determining a measure of how close the first output is to the default output; and
using the determined measure to generate a confidence in the first output.

15. An autonomous device controller, comprising:
a machine learning system for an autonomous device, the machine learning system configured to classify objects represented in input data instances, the machine learning system including:
an input interface configured to obtain the input data instances, the input data instances including sensor data from a sensor of the autonomous device, the sensor detecting an environment of the autonomous device, the autonomous device including at least one of: a vehicle, or a robot;
a storage element configured to store a set of reference data instances, the set of reference data instances including reference sensor data; and
a processor circuit configured to perform a method of classifying the objects represented in the input data instances, including:
mapping the input data instances to first latent input vectors in a first latent space according to a first function,
determining similarities between the first latent input vectors and first latent reference vectors, the first latent reference vectors obtained according to the first function from the set of reference data instances;
for a first input data instance of the input data instances:
identifying a number of reference data instances in the set of reference data instances as parents of the first input data instance based upon at least one of the determined similarities,
determining a second latent input vector in a second latent space for the input data instance from second latent reference vectors, the second latent reference vectors obtained according to a second function from the number of reference data instances identified as parents, and
determining a first output from the second latent input vector by applying a third function to the second latent input vector, the output including a classification an object of the objects, represented in the sensor data, in the environment of the autonomous device, the classification classifying the object as at least one of: a second vehicle, a person, or a cyclist,
wherein the third function and at least one of the first function and the second function are machine learnable functions; and generating a control signal to automatically modify a movement of the autonomous device as a function of the classification of the object, where the modifying of the movement includes at least one of: stopping the autonomous device, decelerating the autonomous device, or steering the autonomous device; and
for a second input data instance of the plurality of input data instances:
identifying that no parents of the second input data instance exist as reference data instances in the set of reference data instances based on the determined similarities;
determining a default second latent input vector in the second latent space; and
determining a default output based on the default second latent input vector.

16. A machine learning method for an autonomous device, the method configured to classify objects represented in input data instances, the machine learning method comprising:
obtaining the input data instances, the input data instances including sensor data from a sensor of the autonomous device, the sensor detecting an environment of the autonomous device, the autonomous device including at least one of: a vehicle, or a robot;
storing a set of reference data instances, the set of reference data instances including reference sensor data;
mapping the input data instances to first latent input vectors in a first latent space according to a first function;
determining similarities between the first latent input vectors and first latent reference vectors, the first latent reference vectors obtained according to the first function from the set of reference data instances;
for a first input data instance of the input data instances:
identifying a number of reference data instances in the set of reference data instances as parents of the first input data instance based upon at least one of the determined similarities;
determining a second latent input vector in a second latent space for the input data instance from second latent reference vectors, the second latent reference vectors obtained according to a second function from the number of reference data instances identified as parents; and
determining a first output from the second latent input vector by applying a third function to the second latent input vector, the output including a classification of an object of the objects, represented in the sensor data, in the environment of the autonomous device,
wherein the third function and at least one of the first function and the second function are machine learnable functions, the classification classifying the object as at least one of: a second vehicle, a person, or a cyclist; and
generating a control signal to automatically modify a movement of the autonomous device as a function of the classification of the object, where the modifying of the movement includes at least one of: stopping the autonomous device, decelerating the autonomous device, or steering the autonomous device;
for a second input data instance of the plurality of input data instances:

identifying that no parents of the second input data instance exist as reference data instances in the set of reference data instances based on the determined similarities;

determining a default second latent input vector in the second latent space; and determining a default output based on the default second latent input vector.

17. A non-transitory computer readable medium including program instructions, which when executed by a processor cause a method of classifying objects represented in input data instances to be performed, the method including:

obtaining the input data instances, the input data instances including sensor data from a sensor of the autonomous device, the sensor detecting an environment of the autonomous device, the autonomous device including at least one of: a vehicle, or a robot;

storing a set of reference data instances, the set of reference data instances including reference sensor data;

mapping the input data instances to first latent input vectors in a first latent space according to a first function;

determining similarities between the first latent input vectors and first latent reference vectors, the first latent reference vectors obtained according to the first function from the set of reference data instances;

for a first input data instance of the input data instances:

identifying a number of reference data instances in the set of reference data instances as parents of the first input data instance based upon at least one of the determined similarities;

determining a second latent input vector in a second latent space for the first input data instance from second latent reference vectors, the second latent reference vectors obtained according to a second function from the number of reference data instances identified as parents; and determining a first output from the second latent input vector by applying a third function to the second latent input vector, the first output including a classification of an object of the objects, represented in the sensor data, in the environment of the autonomous device, wherein the third function and at least one of the first function and the second function are machine learnable functions, the classification classifying the object as at least one of: a second vehicle, a person, or a cyclist; and generating a control signal to automatically modify a movement of the autonomous device as a function of the classification of the object, where the modifying of the movement includes at least one of: stopping the autonomous device, decelerating the autonomous device, or steering the autonomous device; and for a second input data instance of the plurality of input data instances:

identifying that no parents of the second input data instance exist as reference data instances in the set of reference data instances based on the determined similarities;

determining a default second latent input vector in the second latent space; and determining a default output based on the default second latent input vector.

\* \* \* \* \*